US011688074B2

(12) United States Patent
Puri et al.

(10) Patent No.: US 11,688,074 B2
(45) Date of Patent: Jun. 27, 2023

(54) DATA AUGMENTATION INCLUDING BACKGROUND MODIFICATION FOR ROBUST PREDICTION USING NEURAL NETWORKS

(71) Applicant: NVIDIA Corporation, Santa Clara, CA (US)

(72) Inventors: Nishant Puri, San Francisco, CA (US); Sakthivel Sivaraman, Santa Clara, CA (US); Rajath Shetty, Los Altos, CA (US); Niranjan Avadhanam, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 267 days.

(21) Appl. No.: 17/039,437

(22) Filed: Sep. 30, 2020

(65) Prior Publication Data

US 2022/0101047 A1    Mar. 31, 2022

(51) Int. Cl.
*G06T 7/194* (2017.01)
*G06T 5/30* (2006.01)
(Continued)

(52) U.S. Cl.
CPC ............ *G06T 7/194* (2017.01); *G06F 18/214* (2023.01); *G06F 18/24* (2023.01); *G06N 3/08* (2013.01);
(Continued)

(58) Field of Classification Search
None
See application file for complete search history.

(56) References Cited

U.S. PATENT DOCUMENTS 10,885,698 B2    1/2021   Muthler et al.
2021/0248418 A1*  8/2021   Guo ..................... G06T 5/50

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

(Continued)

*Primary Examiner* — Leon Flores
(74) *Attorney, Agent, or Firm* — Taylor English Duma L.L.P.

(57) ABSTRACT

In various examples, a background of an object may be modified to generate a training image. A segmentation mask may be generated and used to generate an object image that includes image data representing the object. The object image may be integrated into a different background and used for data augmentation in training a neural network. Data augmentation may also be performed using hue adjustment (e.g., of the object image) and/or rendering three-dimensional capture data that corresponds to the object from selected views. Inference scores may be analyzed to select a background for an image to be included in a training dataset. Backgrounds may be selected and training images may be added to a training dataset iteratively during training (e.g., between epochs). Additionally, early or late fusion nay be employed that uses object mask data to improve inferencing performed by a neural network trained using object mask data.

22 Claims, 14 Drawing Sheets

(51) Int. Cl.
 G06T 5/00 (2006.01)
 G06N 3/08 (2023.01)
 G06V 40/10 (2022.01)
 G06F 18/214 (2023.01)
 G06F 18/24 (2023.01)

(52) U.S. Cl.
 CPC ............. *G06T 5/002* (2013.01); *G06T 5/30* (2013.01); *G06V 40/11* (2022.01); *G06V 40/113* (2022.01); *G06T 2207/20081* (2013.01); *G06T 2207/20084* (2013.01); *G06T 2207/20132* (2013.01); *G06T 2207/20221* (2013.01); *G06T 2207/30196* (2013.01)

(56) References Cited

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-3 5 (Jun. 15, 2018).

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

Wang, Q., Zhang, L., Bertinetto, L., Hu, W., & Torr, P. H. (2019). Fast online object tracking and segmentation: A unifying approach. In Proceedings of the IEEE conference on computer vision and pattern recognition (pp. 1328-1338).

Molchanov, P., Gupta, S., Kim, K., & Kautz, J. (2015). Hand gesture recognition with 3D convolutional neural networks. In Proceedings of the IEEE conference on computer vision and pattern recognition workshops (pp. 1-7).

\* cited by examiner

DATA AUGMENTATION INCLUDING BACKGROUND MODIFICATION FOR ROBUST PREDICTION USING NEURAL NETWORKS

BACKGROUND

When training a neural network to perform a predictive task such as object classification, the accuracy of the trained neural network is often limited by the quality of the training dataset. In order for training to result in a robust neural network, the network should be trained using challenging training images. For example, when training a neural network for hand pose recognition (e.g., thumbs up, peace sign, fist, etc.), the network may have difficulty detecting poses of hands in front of certain environmental features. If a pose includes extended fingers, the network may perform well when the pose is in front of a mostly solid color environment, but have difficulty when the pose is in front of an environment that includes certain color patterns. As another example, the network may have difficulty with certain poses from certain angles or when the environment and hand are of similar hue.

However, whether a particular training image is challenging for a neural network may depend on many factors, such as the predictive task being performed, the architecture of the neural network, and other training images seen by the network. It is therefore difficult to construct a training dataset that will result in a robustly trained network by anticipating which training images should be used to train the network. It may be possible to estimate what characteristics of training images may be challenging to a neural network. However, even when such an estimation is possible and accurate, it may not be possible or practical to obtain enough images that exhibit those characteristics in order to sufficiently train the network.

SUMMARY

Embodiments of the present disclosure relate to data augmentation including background filtering for robust prediction using neural networks. Systems and methods are disclosed that provide data augmentation techniques, such as those based on background filtering, which may be used to increase the robustness of trained neural networks.

In contrast to conventional systems, the disclosure provides for modifying a background of an object to generate a training image. A segmentation mask may be generated and used to generate an object image that includes image data representing the object. The object image may be integrated into a different background and used for data augmentation in training a neural network. Other aspects of the disclosure provide for data augmentation using hue adjustment (e.g., of the object image) and/or rendering three-dimensional capture data that corresponds to the object from selected view directions. The disclosure also provides for analyzing inference scores to select a background for an image to be included in a training dataset. Backgrounds may be selected and training images may be added to a training dataset iteratively during training (e.g., between epochs). Additionally, the disclosure provides for early or late fusion using object mask data to improve inferencing performed by a neural network trained using object mask data.

BRIEF DESCRIPTION OF THE DRAWINGS

The present systems and methods for data augmentation including background filtering for robust prediction using neural networks is described in detail below with reference to the attached drawing figures, wherein.

DETAILED DESCRIPTION

Figure 1:
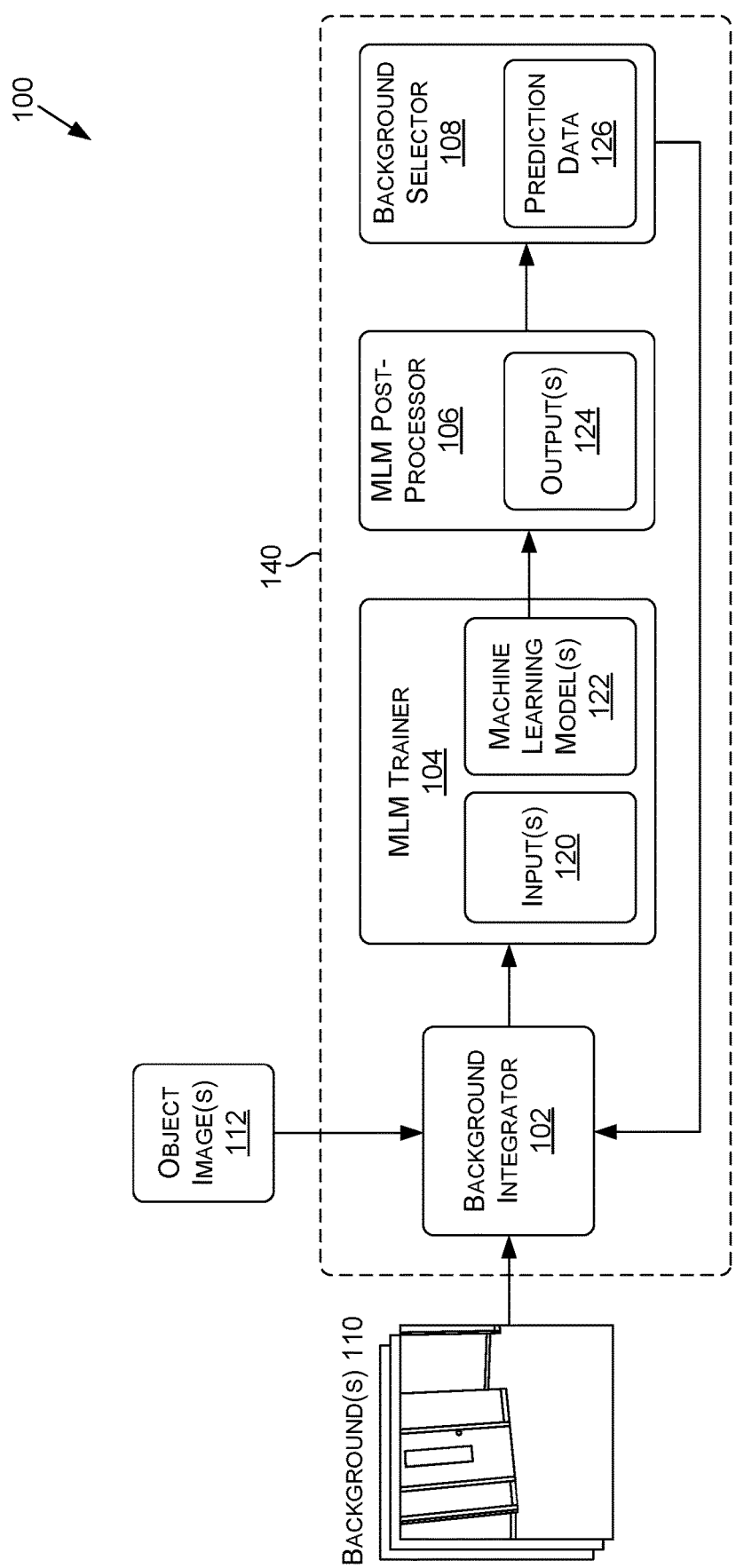
FIG. 1 is a data flow diagram illustrating an example process for training one or more machine learning models based at least on integrating object images with backgrounds, in accordance with some embodiments of the present disclosure.

Systems and methods are disclosed related to data augmentation including background filtering for robust prediction using neural networks. Embodiments of the present disclosure relate to data augmentation including background filtering for robust prediction using neural networks. Systems and methods are disclosed that provide data augmentation techniques, such as those based on background filtering, which may be used to increase the robustness of trained neural networks.

Disclosed embodiments may be implemented using a variety of different systems such as automotive systems, robotics, aerial systems, medial systems, boating systems, smart area monitoring systems, simulation systems, and/or other technology areas. Disclosed approaches may be used for any perception-based or more generally image-based analysis using machine learning models, such as for monitoring, and/or tracking of objects and/or the environment.

Applications of disclosed techniques include multimodal sensor interfaces, which may be applied in the context of healthcare. For example, a patient who is intubated or otherwise unable to speak to communicate may use had poses or gestures interpreted by a computing system. Applications of disclosed techniques further include autonomous driving and/or vehicle control or interaction. For example, disclosed techniques may be used to implement hand pose or gesture recognition for in cabin sensing of the vehicle 1100 of FIGS. 11A-11D to control convenience features, such as control of multimedia options. Pose of gesture recognition may also be applied to the external environment of the vehicle 1100 to control any of a variety of autonomous driving control operations including advanced driver assistance systems (ADAS) functions.

As various examples, disclosed techniques may be implemented in systems that comprise or are included in one or more of a system for performing conversational AI or personal assistance operations, a system for performing simulation operations, a system for performing simulation operations to test or validate autonomous machine applications, a system for performing deep learning operations, a system implemented using an edge device, a system incorporating one or more Virtual Machines (VMs), a system implemented at least partially in a data center, or a system implemented at least partially using cloud computing resources.

In contrast to conventional systems, the disclosure provides for identifying a region in an image that corresponds to an object, and using the region to filter, remove, replace, or otherwise modify the background of the object and/or the object itself to generate a training image. In accordance with the disclosure, a segmentation mask may be generated that identifies one or more segments that correspond to the object and one or more segments that correspond to a background of the object in a source image. The segmentation mask may be applied to the source image to identify the region that corresponds to the object, for example, to generate an object image that includes image data representing the object. The object image may be integrated into a different background and used for data augmentation in training a neural network. Other aspects of the disclosure provide for data augmentation using hue adjustment (e.g., of the object image) and/or rendering three-dimensional capture data that corresponds to the object from selected view directions.

Further aspects of the disclosure provide approaches for selecting a background of an object for training a neural network. In accordance with the disclosure, a Machine Learning Model (MLM) may be at least partially trained and inference data may be generated by the MLM using images that include different backgrounds. The MLM may comprise the neural network during training or a different MLM. Inference scores that correspond to the inference data may be analyzed to select one or more characteristics of training images, such as a particular background or background type for an image to be included in a training dataset. The image may be selected from existing images or generated using an object image and a background using any suitable approach, such as those described herein. In at least one embodiment, one or more characteristics may be selected and one or more corresponding training images may be added to a training dataset iteratively during training.

The disclosure further provides approaches for using object mask data to improve inferencing performed by a neural network trained using object mask data. Late fusion may be performed where a set of inference data is generated from a source image and another set of inference data is generated from an image that captures object mask data, such as the object image (e.g., using two copies of the neural network). The sets of inference data may be fused and used to update the neural network. In further examples, early fusion may be performed where the source image and the image that captures object mask data are combined and inference data is generated from the combined image. The object mask data may be used to de-emphasize or otherwise modify the background of the source image.

Now referring to FIG. 1, FIG. 1 is a data flow diagram illustrating an example process 100 for training one or more machine learning models based at least on integrating object images with backgrounds, in accordance with some embodiments of the present disclosure. The process 100 is described with respect to a Machine Learning Model (MLM) training system 140, by way of example. Amongst other potential components, the MLM training system 140 may include a background integrator 102, an MLM trainer 104, an MLM post-processor 106, and a background selector 108.

At a high level, the process 100 may include the background integrator 102 receiving one or more of backgrounds 110 (which may be referred to as background images) and object images 112 corresponding to one or more objects (e.g., to be classified, analyzed, and/or detected by a MLM(s) 122). The background integrator 102 may integrate the object images 112 with the background(s) 110 to produce image data that captures (e.g., represents) at least a portion of the background(s) 110 and the object(s) in one or more images. The MLM trainer 104 may produce an input(s) 120 to the one or more MLMs 122 from the image data. The MLM(s) 122 may process the input(s) 120 to generate one or more outputs 124. The MLM post-processor 106 may process the output(s) 124 to produce prediction data 126 (e.g., inference scores, object class labels, object bounding boxes or shapes, etc.). The background selector 108 may analyze the prediction data 126 and select one or more of the backgrounds 110 and/or objects for training based at least on the prediction data 126. In some embodiments, the process 100 may be repeated for any number of iterations until one or more of the MLMs 122 are sufficiently trained or the background selector 108 may be used a single time or intermittently to select backgrounds 110 for a first training iteration and/or or any other iterations.

For example, and without limitation, the MLM(s) 122 described herein may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Figure 2:
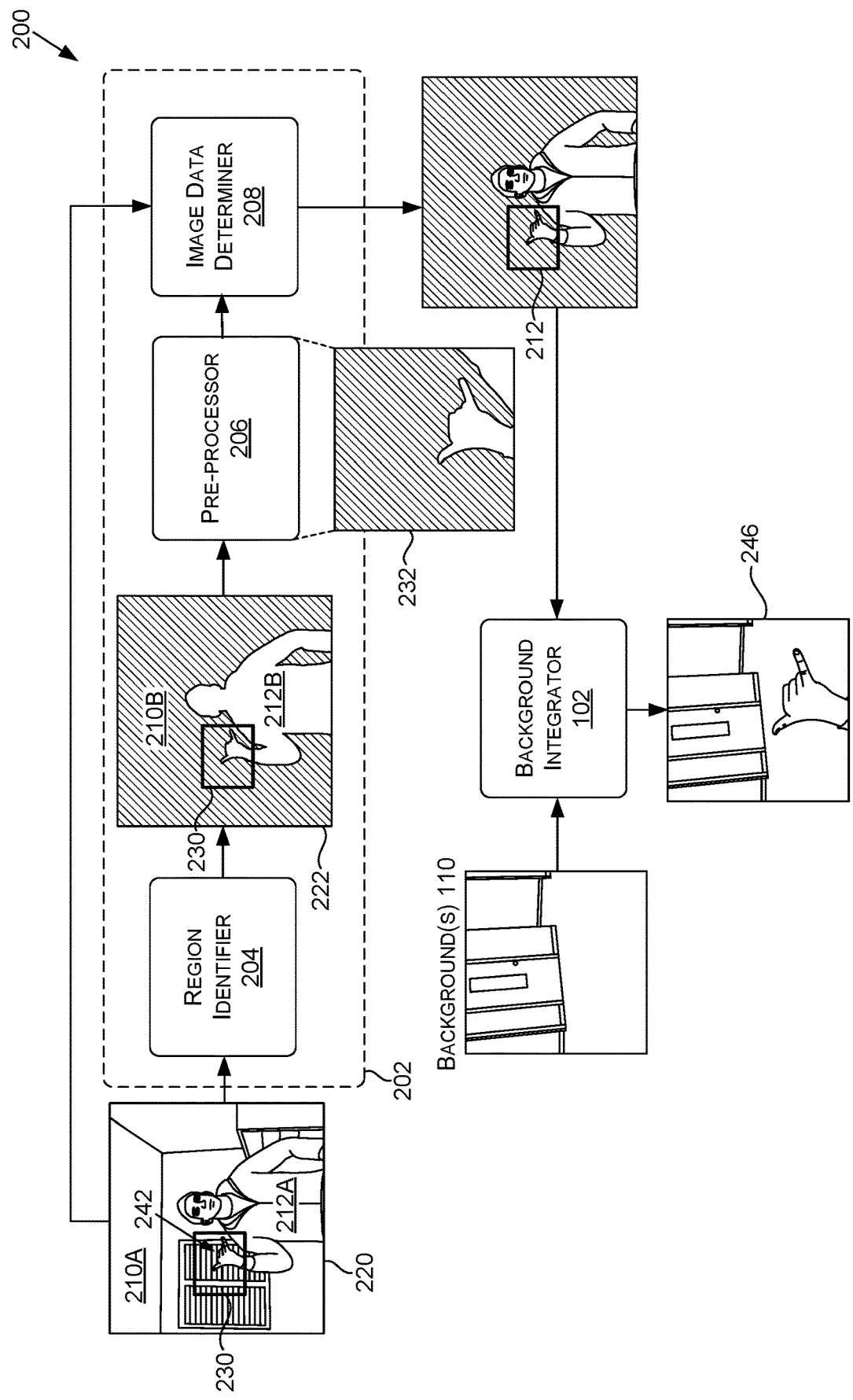
FIG. 2 is a data flow diagram illustrating an example process for generating an object image and integrating the object image with one or more backgrounds, in accordance with some embodiments of the present disclosure.

The process 100 may be used, at least in part, to train one or more of the MLM(s) 122 to perform a prediction task. The present disclosure focuses on pose recognition and/or gesture recognition, and more specifically hand pose recognition. However, disclosed techniques are widely applicable to training a MLM to perform a variety of possible prediction tasks, such as image and/or object classification tasks. Examples include object detection, bounding box or shape determination, object classification, pose classification, gesture classification, and many more. For example, FIG. 2 shows an example of an image 246 which may be captured by the input(s) 120 to the MLM 122. The process 100 may be used to train the MLM 122 to predict a pose of a hand depicted in the image 246 (e.g., thumb up, thumb down, fist, peace sign, open hand, OK sign, etc.).

In some embodiments, one or more of the iterations of the process 100 may not include training one or more of the MLM(s) 122. For example, an iteration may be used by the background selector 108 to select one or more of the backgrounds 110 and/or objects corresponding to the object images 112 for inclusion in training datasets used by the MLM trainer 104 for training. Further, in some examples, the process 100 may use one MLM 122 to select the backgrounds 110 and/or objects for a training dataset in one iteration and may train the same or a different MLM 122 using the training dataset (e.g., in a subsequent iteration of the process 100 or otherwise). For example, the MLM 122 used to select from the backgrounds 110 for training may be partially or fully trained to perform the prediction task. Where an iteration(s) of the process 100 uses a trained or partially trained MLM 122 to select from the backgrounds 110 for training another MLM 122, the iteration(s) may be used to bootstrap the training of the other MLM 122 by selecting challenging background images and/or background and object image combinations for training.

In various examples, one or more iterations of the process 100 may form a feedback loop where the background selector 108 uses the prediction data of an iteration (e.g., a training epoch) to select one or more of the backgrounds 110 and/or objects corresponding to the object images 112 for inclusion in a subsequent training dataset. In a subsequent iteration (e.g., a subsequent training epoch) of the process 100, the background integrator 102 may generate or otherwise prepare or select corresponding images which the MLM trainer 104 may incorporate into a training dataset. The training dataset may then be applied to the MLM 122 that is being trained to generate the prediction data 126 used by the background selector 108 to select one or more of the backgrounds 110 and/or objects corresponding to the object images 112 for inclusion in a subsequent training dataset. The feedback loop may be used to determine the augmentations to ensure continuous improvements to the accuracy, generalization performance, and robustness of the MLM(s) 122 being trained.

In various examples, based at least on the background selector 108 selecting one or more backgrounds and/or objects, the MLM trainer 104 incorporates one or more images from the background integrator 102 that include the selected background and/or selected background and object combination. As an example, the MLM trainer 104 may add one or more images to a training dataset used for a prior training iteration and/or epoch. The training dataset may grow for each iteration. However, in some cases, the MLM trainer 104 may also remove one or more images from the training dataset used for a prior training iteration and/or epoch (e.g., based on a selection by the background selector 108 for removal and/or based on the training dataset exceeding a threshold number of images). In the example shown, the background integrator 102 may generate one or more images to be included in a training dataset at the outset of an iteration of the process 100 based on selections made by the background selector 108. In other examples, one or more of the images may be pre-generated by the background integrator 102, such as at least partially in advance of any training using the process 100 and/or during one or more prior iterations. Where an image is pre-generated, the MLM trainer 104 may fetch the pre-generated image from storage based on the selection(s) made by the background selector 108.

Selection of a background described herein may refer to selection of the background for inclusion of at least one image used for training. Selection of a background may also include selection of an object to include in the image with the background. In at least one embodiment, the background selector 108 may select backgrounds and/or background and object combinations based at least on a confidence of the MLM(s) 122 in one or more predictions made using the MLM(s) 122. In various examples, the confidence may be captured by a set of inference scores that correspond to predictions of the prediction task performed by one or more of the MLM(s) 122 on one or more images. For example, the predictions may be made in a current iteration and/or one or more previous iterations of the process 100. An inference score may refer to a score that an MLM is trained to provide or is being trained to provide regarding a prediction task or portion thereof. In some examples, an inference score may represent the confidence of the MLM regarding one or more of the corresponding outputs 124 (e.g., tensor data) and/or may be used to determine or compute the confidence regarding the prediction task. For example, an inference score(s) may represent the confidence of the MLM(s) 122 in an object detected in an image belonging to a target class (e.g., a probability of an input 120 belonging to the target class).

The background selector 108 may select one or more of backgrounds and/or background and object combinations based on the inference scores using a variety of possible approaches. In at least one embodiment, the background selector 108 may select one or more particular backgrounds and/or object based at least on analysis of inference scores corresponding to images that include those elements. In at least one embodiment, the background selector 108 may select one or more backgrounds and/or object of a particular class or type or that have one or more other particular characteristics based at least on analysis of inference scores corresponding to images that include those elements having those one or more characteristics (e.g., particular background, particular object, texture, color, lighting condition, object and/or overlay, hue, perspective described with respect to FIG. 4, orientation, skin tone, size, theme, included background elements, etc.). For example, the background selector 108 may select at least one background that includes blinds and a gesture that includes an open palm based at least on inference scores of images that shared those characteristics. As another example, the background selector 108 may select a particular background based at least on inference scores of images that include that background. As an additional example, the background selector 108 may select a particular background and an object of an object class (e.g., thumbs up, thumbs down, etc.) based at least on inference scores of images that include that background and an object of the object class.

In some cases, the inference scores may be evaluated by the background selector 108 based at least on computing a confusion score. A confusion score may serve as a metric that quantifies relative network confusion regarding predictions made for one or more images having a particular set of characteristics. Where the confusion score exceeds a threshold value (e.g., indicating sufficient confusion), the background selector 108 may select at least some elements (e.g., background or background and object combination) that have the set of characteristics to modify the training data set. In at least one embodiment, confusion for a background(s) may be based at least in part on a number of correct and incorrect predictions made for images that include an element(s) that has the set of characteristics. For example, a confusion score may be computed based at least on a ratio between correct and incorrect predictions. Additionally or alternatively, a confusion score may be computed based at least on a variance in accuracy of predictions or inference scores for images that element(s) that have the set of characteristics (e.g., indicating that when a particular background or background type is used there is high variance across target classes).

The background selector 108 may select one or more background and/or background and object combinations for inclusion in at least one image for a training data set based at least on selecting one or more different element characteristics. For example, the background selector 108 may select one or more different element characteristics based at least on the corresponding confusions scores. The background selector 108 may rank different sets of characteristics and select one or more sets for modification to the training dataset based on the rankings. As a non-limiting example, the background selector 108 may select the top N particular backgrounds or backgrounds and object combinations (or other set of characteristics) where N is an integer (e.g., for each confusion score that exceeds a threshold value).

The background integrator 102 may select, retrieve (e.g., from storage), and/or generate one or more images that satisfy the selections made by the background selector 108 to modify to the training dataset. Where the background integrator 102 generates an image from a selected background, the background integrator 102 may include an entirety of the background image in the image or one or more portions of the background. For example, the background integrator 102 may sample a region (e.g., a rectangle sized based on the input 120 to the MLM 122) from the background using a random or non-random sampling approach. Thus, an image processed by the MLM(s) 122 may include an entirety of the background image or a region of the background image (e.g., a sampled region). Similarly, where the background integrator 102 generates an image from a selected object, the background integrator 102 may include an entirety of the object image in the image or a portion of the object image.

In at least one embodiment, the background integrator 102 may generate one or more synthetic backgrounds. For example, a synthetic background may be generated for cases where network bias and sensitivity are understood (either empirically from measuring the performance of the network or intuitively). For example, a synthetic background of a particular type (ex. Dots and stripes) may be generated for a network that is sensitive to those particular textures, where the background selector selects that background type. One or more synthetic backgrounds may be generated prior to any training of the MLM(s) 122 and/or during training (e.g., between iterations or epochs). Various possible approaches may be used to generate a synthetic background, for example, based at least on rendering a three-dimensional virtual environment associated with the background type, algorithmically generating a texture that includes a selected pattern, modifying an existing background or image, etc.

In accordance with aspects of the disclosure, the object images 112 may be extracted from one or more sources images and the background integrator 102 may use one or more of the backgrounds 110 to replace or modify an original background of a source image. Referring now to FIG. 2, FIG. 2 is a data flow diagram illustrating an example process 200 for generating an object image 212 and integrating the object image 212 with one or more of the backgrounds 110, in accordance with some embodiments of the present disclosure.

The process 200 is described with respect to an object image extraction system 202, by way of example. Amongst other potential components, the object image extraction system 202 may include a region identifier 204, a pre-processor 206, and an image data determiner 208.

As an overview, in the process 200, the region identifier 204 may be configured to identify a region within a source image. For example, the region identifier 204 may identify a region 212A within a source image 220 that corresponds to an object (e.g., a hand) having a background in the source image 220. The region identifier 204 may further generate a segmentation mask 222 that includes a segment 212B that corresponds to the object based on identifying the region 212A. The region identifier 204 may further detect a location of the object to define an area 230 of the source image 220 and/or segmentation mask 222. The pre-processor 206 may process at least a portion of the segment 212B in the area 230 of the segmentation mask 222 to produce an object mask 232. The image data determiner 208 may use the object mask 232 to generate the object image 212 from the source image 220. The object image may then be provided to the background integrator 102 for integration with one or more backgrounds 110 (e.g., to superimpose or overlay the object over the background images).

In accordance with various embodiments, one or more of the object images 112, such as the object image 212, may be generated in advance of training the MLM(s) 122 and/or during the training of the MLM(s) 122. For example, one or more of the object images 112 may be generated (e.g., as described with FIG. 2), and stored, then retrieved as needed to generate the input(s) 120 in the process 100. As another example, one or more of the object images 112 may be generated during the process 100, such as on-the-fly or as needed by the background integrator 102. In some embodiments an object image 112 is generated on-the-fly during the process 100, then may be stored and/or reused in subsequent iterations of the process 100 and/or for training MLMs other than the MLM(s) 122 at a later time.

As described herein, the region identifier 204 may identify the region 212A within a source image 220 that corresponds to an object (e.g., a hand) having a background in the source image 220. In the example shown, the region identifier 204 may also identify a region 210A within the source image 220 that corresponds to the background of the object. In other examples, the region identifier 204 may only identify the region 212A.

In at least one embodiment, the region identifier 204 may identify the region 212A to determine at least the segment 212B of the source image 220 corresponds to the object based at least on performing image segmentation on the source image. The image segmentation may further be used to identify the region 210A to determine a segment 212B of the source image 220 corresponds to the background based at least on performing image segmentation on the source image 220. In at least one embodiment, the region identifier 204 may generate data representative of the segmentation mask 222 from the source image 220, wherein the segmentation mask 222 indicates the segment(s) 212B that correspond to the object (white pixels in FIG. 2) and/or the segment(s) 210B that correspond to the background (black pixels in FIG. 2).

The region identifier 204 may be implemented in a variety of potential ways, such as using AI-powered background removal. In at least one embodiment, the region identifier 204 includes one or more MLMs trained to classify or label individual or groups of pixels of images. For example, the MLM(s) may be trained to identify a foreground (e.g., corresponding to an object) and/or a background in an image, and the image segments may correspond to the foreground and/or background. As a non-limiting example, the region identifier 204 may be implemented using background removal technology of RTX Greenscreen by NVIDIA Corporation. In some examples, the MLM(s) may be trained to identify object types and label pixels accordingly.

In at least one embodiment, the region identifier 204 may include one or more object detectors, such as an object detector trained to detect an object (e.g., a hand) that will be classified by the MLM(s) 122. The object detector may be implemented using one or more MLMs trained to detect the object. The object detector may output data indicating a location of object and may be used to define the area 230 of the source image 220 and/or the segmentation mask 222 that includes the object. For example, the object detector may be trained to provide a bounding box or shape of the object and the bounding box or shape may be used to define the area 230.

In the example shown, the area 230 may be defined by expanding the bounding box whereas in other examples the bounding box may be used as the area 230. In the present example the region identifier 204 may identify the segment 212B that corresponds to the object by applying the source image 220 to the MLM(s). In other examples, the region identifier 204 may apply the area 230 to the MLM(s) rather than the source image (or in addition to the source image in some embodiments). By applying the source image 220 to the MLM(s), the MLM(s) may have additional context not available in the area 230 that can improve the accuracy of the MLM(s).

In embodiments where the area 230 is determined, the pre-processor 206 may perform pre-processing based at least on the area 230. For example, the area 230 of the segmentation mask 222 may be pre-processed by the pre-processor 206 prior to being used by the image data determiner 208. In at least one embodiment, the pre-processor 206 may crop image data corresponding to the area 230 from the segmentation mask 222 and process the cropped image data to produce an object mask 232. The pre-processor 206 may perform various types of pre-processing on the area 230, which may improve the ability of the image data determiner 208.

Figure 3:
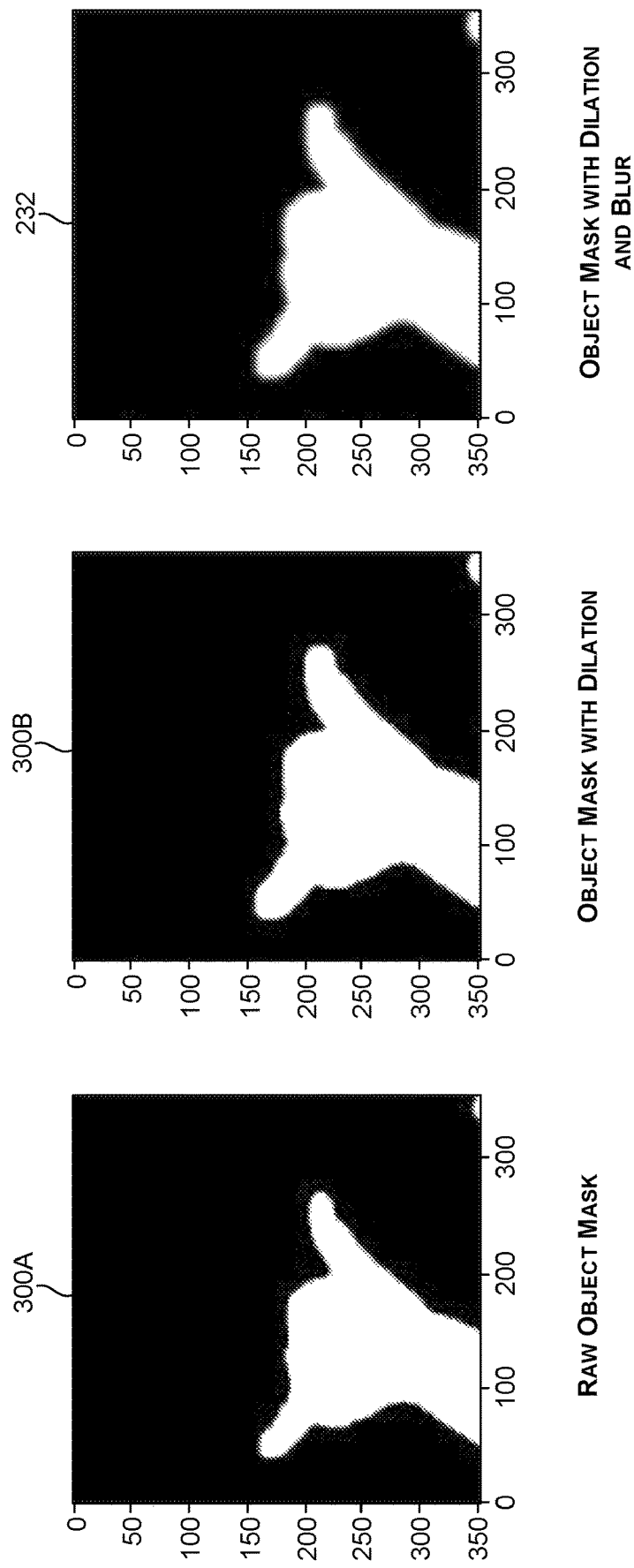
FIG. 3 includes examples of pre-processing that may be used to generate an object mask used for generating object images, in accordance with some embodiments of the present disclosure.

Referring now to FIG. 3, FIG. 3 includes examples of pre-processing that may be used to generate an object mask used for generating object images, in accordance with some embodiments of the present disclosure. By way of example, the pre-processor 206 may crop the segmentation mask 222 resulting in an object mask 300A. The pre-processor 206 may perform dilation on the object mask 300A, resulting in an object mask 300B. The pre-processor 206 may then blur the object mask 300B, resulting in the object mask 232. The object mask 232 may then be used by the image data determiner 208 to generate the object image 212.

The pre-processor 206 may use dilation to expand the segment 212B of the object mask 300A that corresponds to the object. For example, the segment 212B may be expanded into the segment 210B that corresponds to the background. In embodiments, the pre-processor 206 may perform binary dilation. Other types of dilation may be performed, such as grayscale dilation. As an example, the pre-processor 206 may first blur the object mask 300A, then perform grayscale dilation. Dilation may be useful to increase the robustness of the object mask 232 to errors in the segmentation mask 222. For example, where the object includes a hand, a palm may at times be classified as being in the background. Dilation is one approach to remediating this potential error. Other mask pre-processing techniques are within the scope of the disclosure, such as binary or greyscale erosion. As an example, erosion may be performed on the segment 210B that corresponds to the background.

The pre-processor 206 may use the blurring (e.g., Gaussian blur) to assist the background integrator 102 in easing the transition between image data corresponding to the object in the object image 212 and image data corresponding to a background 110. Without easing the transition between the object and the background, areas that correspond to edges of the object mask 232 may be sharp and artificial. Using a blending technique such as blurring then applying the object mask may result in a more natural or realistic transition between the object and the background 110 in the image 246. While mask processing has been described as being performed on an object mask prior to application of the mask, in other examples, similar or different image processing operations may be performed by the image data determiner 208 in applying an object mask (e.g., to the source image 220).

Returning to FIG. 2, the image data determiner 208 may generally use an object mask, such as the object mask 232, to generate the object image 212. For example, the image data determiner 208 may use the object mask 232 to identify and/or extract a region 242 from the source image 220 that corresponds to the object. In other embodiments an object mask may not be employed and another technique may be used to identify and/or extract the region 242. When using the object mask 232, the image data determiner 208 may multiply the object mask 232 with the source image 220 to obtain the object image 212 comprising image data representative of the region 242 that corresponds to the object (e.g., the foreground of the source image 220).

In integrating the object image 212 with a background 110, the background integrator 102 may use the object image 212 as a mask and the inversion of the mask may be applied to the background 110 with the resultant image being blended with the object image. For example, the background integrator 102 may perform alpha compositing between the object image 212 and the background 110. Blending the object image 212 with the background integrator 102 may use a variety of potential blending techniques. In some embodiments, the background integrator 102 may use alpha blending to integrate the object image 212 with the background 110. Alpha blending may zero out the background from the object image 212 when combining the object image 212 with the background 110 and the foreground pixels may be superimposed over the background 110 to generate the image 246, or pixels may be weighted (e.g., from 0 to 1) when combining image data from the object image 212 and the background 110 according to the blurring applied by the pre-processor 206 or otherwise. In at least one embodiment, the background integrator 102 may employ one or more seamless blending techniques. A seamless blending technique may aim to produce a seamless boundary between the object and the background 110 in the image 246. Examples of seamless blending techniques include gradient domain blending, Laplacian pyramid blending, or Poisson blending.

Further Examples of Data Augmentation Techniques

As described herein, the process 200 may be used for augmentation of a training dataset used to train a MLM, such as the MLM 122 using the process 100. The disclosure provides further approaches which may be used to augment a training dataset. In accordance with at least some embodiments, the hue of an object identified in a source image, such as the source image 220 may be modified for data augmentation. As an example, where the object represents at least a portion of a human, skin tone, hair color, and/or other hues may be modified to augment the training dataset. For example, hue for one or more portions of a region corresponding to an object may be shifted (e.g., uniformly or otherwise). In at least one embodiment, the hue may be randomly or non-randomly selected. In some cases, the hue may be selected based on analyzing the prediction data 126. For example, hue may be used as a characteristic for selecting or generating one or more training images (e.g., by the background integrator 102), as described herein.

Certain areas such as the background or non-primary or minor sections of the region that tend to have consistent hue for different real-life variations of the object may retain the original hue. For example, if the object is a car, the panels may be shifted in hue while retaining hue for lights, bumpers, and tires. In at least one embodiment, the background integrator 102 may perform the hue modification. For example, hue modification may be performed on one or more portions of the object represented in the object image 212. In other examples, the object image 212 or the object mask 232 may be used (e.g., by the image data determiner 208) to identify image data representing the object and modify the hue in one or more regions of the source image 220. These example may not include the background integrator 102.

Figure 4:
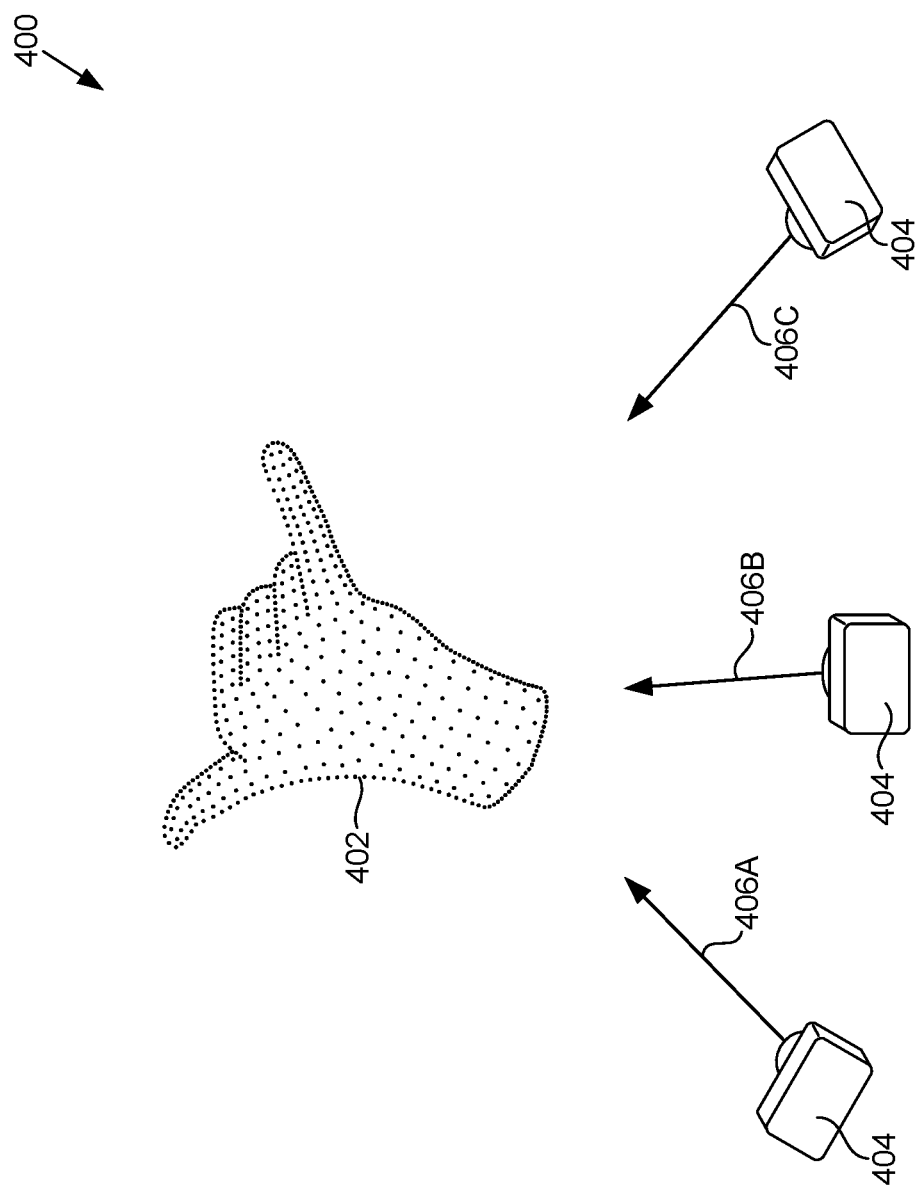
FIG. 4 is an illustration of how a three-dimensional capture of an object may be rasterized from multiple views, in accordance with some embodiments of the present disclosure.

In accordance with at least some embodiments, the source image 220 may be rendered from a variety of different views of the object in an environment for data augmentation. Referring now to FIG. 4, FIG. 4 is an illustration of how a three-dimensional (3D) capture 402 of an object may be rasterized from multiple views, in accordance with some embodiments of the present disclosure. In at least one embodiment, the object image extraction system 202 may select a view of the object in an environment. For example, the object image extraction system 202 may select from a view 406A, 406B, 406C, or any arbitrary view of the object in an environment 400. The object image extraction system 202 may then generate the source image 220 based at least on rasterizing a 3D capture of the object in the environment from the view. For example, the three-dimensional (3D) capture 402 may comprise depth information captured by a physical or virtual depth sensing camera in a physical or virtual environment (which may be different than the environment 400). In one or more embodiments, the 3D capture 402 may comprise a point cloud that captures at least a portion of the object and potentially additional elements of the environment 400. If, for example, the view 406A is selected, the object image extraction system 202 may use at least the 3D capture 402 to rasterize the source image 220 from the view 406A of a camera 404. In at least one embodiment, a view may be randomly or non-randomly selected. In some cases, the view may be selected based on analyzing the prediction data 126. For example, the view may be used as a characteristic for selecting or generating one or more training images (e.g., by the background integrator 102), as described herein (e.g., in combination with object class). In at least one embodiment, the object may be rasterized from the view to generate an object image 112, which may then be integrated with one or more backgrounds using approaches described herein. In other examples, the object may be rasterized with a background 110 (a two-dimensional image), or with other 3D content of the environment 400 to form a background.

Examples of Inferencing Using Object Masks

As described herein, object masks may be used for data augmentation in training the MLM(s) 122, for example, using the process 100. In at least one embodiment, the MLM(s) 122 trained using mask data may perform inferencing on images without leveraging object masks. For example, the inputs 120 to the MLM(s) 122 during deployment may correspond to one or more images captured by a camera. In such examples, the object masks may only be used for data augmentation. In other embodiments, object masks may also be leveraged for inferencing. Examples of how object masks may be leveraged for inferencing are described with respect to FIGS. 5A and 5B.

Figure 5A:
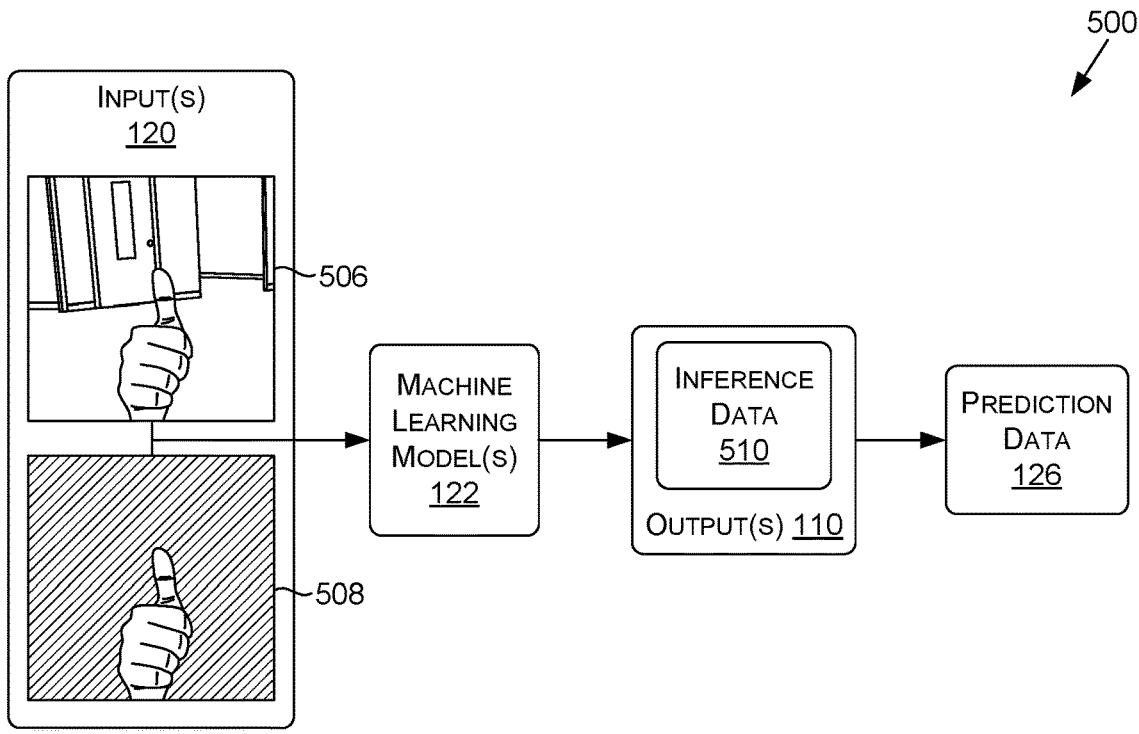
FIG. 5A is a data flow diagram illustrating an example of inferencing using a machine learning model and early fusion of object mask data, in accordance with some embodiments of the present disclosure.

Referring now to FIG. 5A, FIG. 5A is a data flow diagram 500 illustrating an example of inferencing using the MLM 122 and early fusion of object mask data, in accordance with some embodiments of the present disclosure. In the example of FIG. 5A, the MLM(s) 122 may be trained to perform inferencing on an image 506 while leveraging an object image 508 that corresponds to an object mask of the image 506. For example, the inputs 120 may be generated from a combination of the image 506 and the object image 508, then provided to the MLM 122 (e.g., a neural network), which may generate the output(s) 124 comprising inference data 510. Where the MLM 122 comprises a neural network, the inference data 510 may comprise tensor data from the neural network. Post-processing may be performed on the inference data 510 to generate the prediction data 126.

The object image 508 is one example of object mask data that may be combined with the image 506 for inferencing. Where early fusion of object mask data is used for inferencing, as in the data flow diagram 500, the input(s) 120 to the MLM(s) 122 may similarly be generated during training (e.g., in the process 100). Generally, object mask data may capture information regarding a manner in which the region identifier 204 generates masks from source images. By leveraging the object mask data during training and inferencing, the MLM(s) 122 may learn to account for any errors or unnatural artifacts that may be produced by the object mask generation. The object mask data may also capture information regarding a manner in which the pre-processor 206 pre-processes object masks to capture any errors or unnatural artifacts that may be produced by or remain after the pre-processing.

The object image 508 may be generated (e.g., at inference time) using the object image extraction system 202 similar to the object image 212. While the object image 508 is shown in FIGS. 5A and 5B, in other examples, the segmentation mask 222 and/or the object mask 232 may be used in addition to or instead of the object image 508 (before or after pre-processing by the pre-processor 206).

Various approaches may be used to generate the inputs 120 from a combination of the image 506 and the object image 508 (more generally object mask data). In at least one embodiment, the image 506 and the object image 508 are provided as separate inputs 120 to the MLM(s) 122. As further examples, the image 506 and the object image 508 may be combined to form a combined image and the input(s) 120 may be generated from the combined image. In at least one embodiment, the object mask data may be used to fade, de-emphasize, mark, indicate, distinguish, or otherwise modify one or more portions of the image 506 that represent the background (as captured by the object mask data) relative to the object or foreground of the image 506. For example, the image 506 may be blended with the object image 508 resulting in the background of the image 506 being faded, blurred, or defocused (e.g., using a depth of field effect). When combining the image 506 and the object image 508, the weights used to determine resulting pixel colors may decrease (e.g., exponentially) with distance from the object as dictated by the object mask data (e.g., using a foveation effect).

Figure 5B:
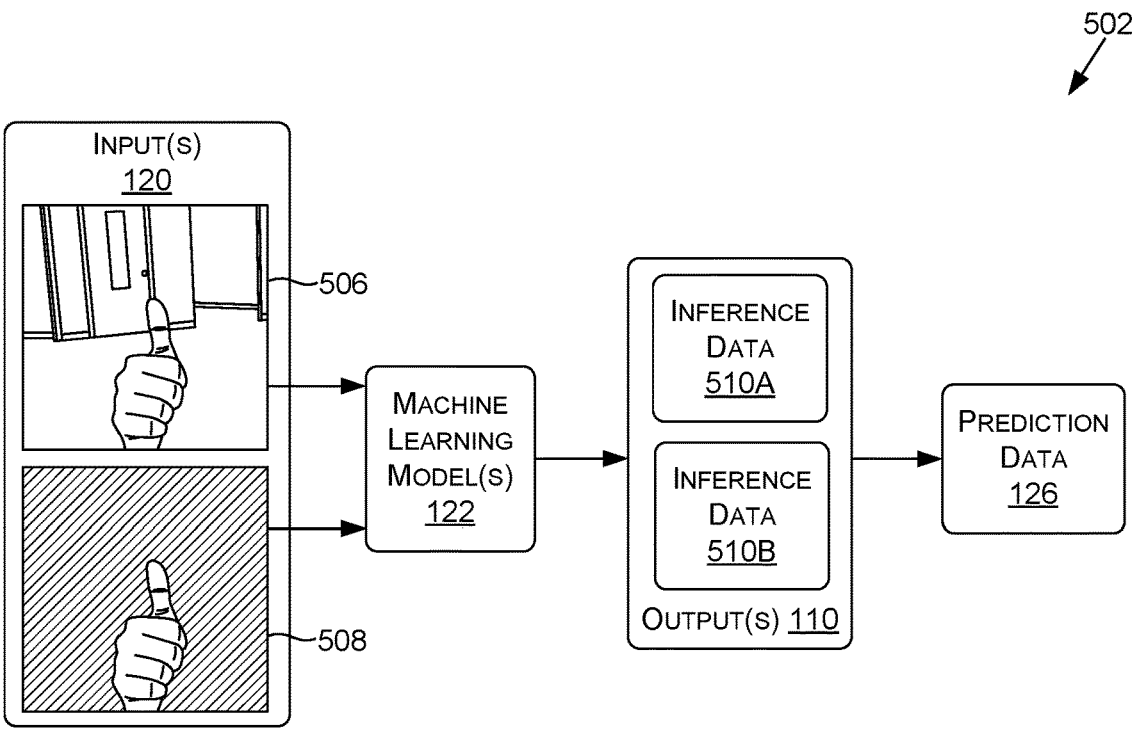
FIG. 5B is a data flow diagram illustrating an example of inferencing using a machine learning model and late fusion of object mask data, in accordance with some embodiments of the present disclosure.

Referring now to FIG. 5B, FIG. 5B is a data flow diagram 502 illustrating an example of inferencing using the MLM(s) 122 and late fusion of object mask data, in accordance with some embodiments of the present disclosure.

In the example of FIG. 5B, the MLM(s) 122 may provide separate outputs 124 for the image 506 and the object image 508. The outputs 124 may include inference data 510A corresponding to the image 506 and inference data 510B corresponding to the object image 508. Further, the MLM(s) 122 may comprise separate inputs 120 for the image 506 and the object image 508. For example, the MLM(s) 122 may comprise multiple copies of an MLM (122) trained to perform inferencing in images, with one copy performing inferencing on the image 506 and generating the inference data 510A and another copy performing inferencing on the object image 508 and generating the inference data 510B (e.g., in parallel). Post-processing may be performed on the inference data 510A and the inference data 510B and may use late fusion to generate the prediction data 126. For example, corresponding tensor values across the inference data 510A and the inference data 510B may be combined (e.g., averaged) to fuse the inference data, then further post-processing may be performed on the fused inference data to generate the prediction data 126. In at least one embodiment, tensor values of the inference data 510A and the inference data 510B may be combined using weights (e.g., using a weighted average). In at least one embodiment, the weights may be tuned over a validation dataset.

Inferencing using the MLM(s) 122 may also include temporal filtering of the inference scores to generate the prediction data 126, which may improve the temporal stability of predictions. Additionally, the examples shown primarily relate to static pose recognition. However, disclosed techniques may also be applied to dynamic pose recognition, which may be referred to as a gesture. To train and use the MLM to predict a gesture, in at least one embodiment, multiple images may be provided to the MLM 122 that capture the object over a period of time or a number or sequence of frames. Where object mask data is employed, object mask data may be provided for each input image.

Figure 6:
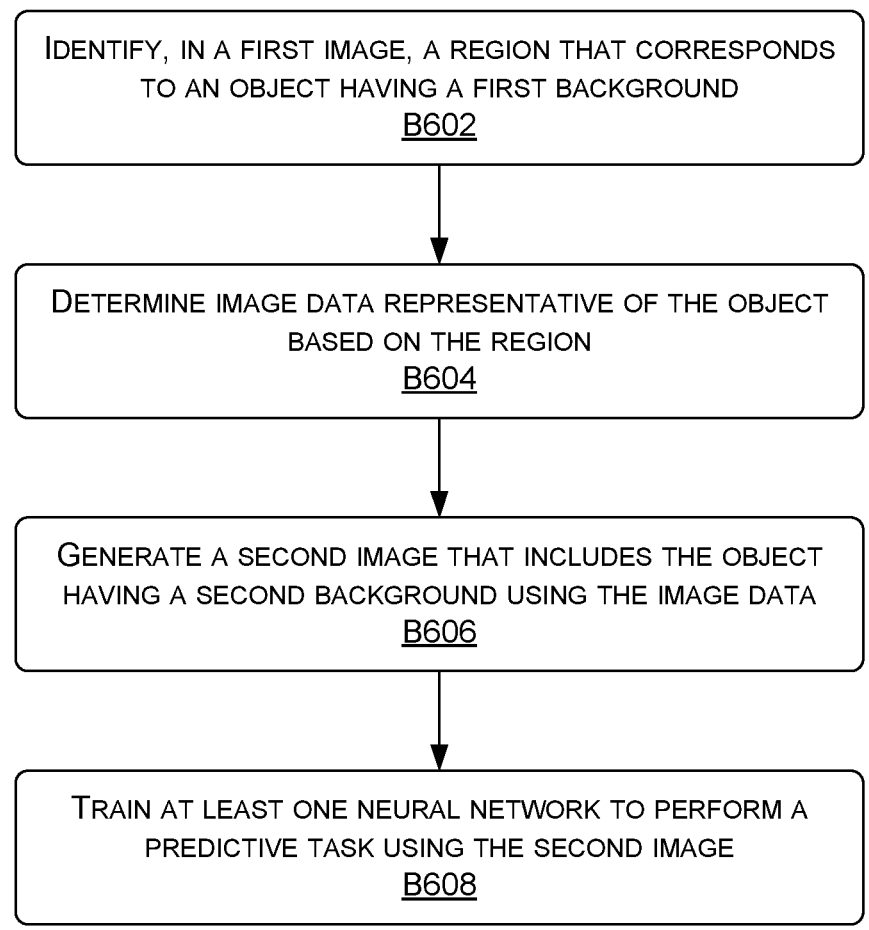
FIG. 6 is a flow diagram showing a method for training one or more machine learning models based at least on integrating object images with at least one background, in accordance with some embodiments of the present disclosure.

Now referring to FIG. 6, each block of method 600, and other methods described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 600 is described, by way of example, with respect to the system 140 of FIG. 1 and the system 202 of FIG. 2. However, this method may additionally or alternatively be executed by any one system, or any combination of systems, including, but not limited to, those described herein.

FIG. 6 is a flow diagram showing a method 600 for training one or more machine learning models based at least on integrating object images with at least one background, in accordance with some embodiments of the present disclosure. The method 600, at block B602, includes identifying, in a first image, a region that corresponds to an object having a first background. For example, the region identifier 204 may identify, in the source image 220, the region 212A that corresponds to an object having a background in the source image 220.

The method 600, at block B604, includes determining image data representative of the object based at least on the region. For example, the image data determiner 208 may determine image data representative of the object based at least on the region 212A of the object. In at least one embodiment, the image data determiner 208 may determine the image data using the object mask 232 or a non-mask based approach.

The method 600, at block B606, includes generating a second image that includes the object having a second background using the image data. The background integrator 102 may generate the image 246 that includes the object having a background 110 based at least on integrating, using the image data, the object with the background 110. For example, the image data determiner 208 may incorporate the image data into the object image 212 and provide the object image 212 to the background integrator 102 for integration with the background 110.

The method 600, at block B608, includes training at least one neural network to perform a predictive task using the second image. For example, the MLM trainer 104 may train the MLM(s) to classify objects in images using the image 246.

Figure 7:
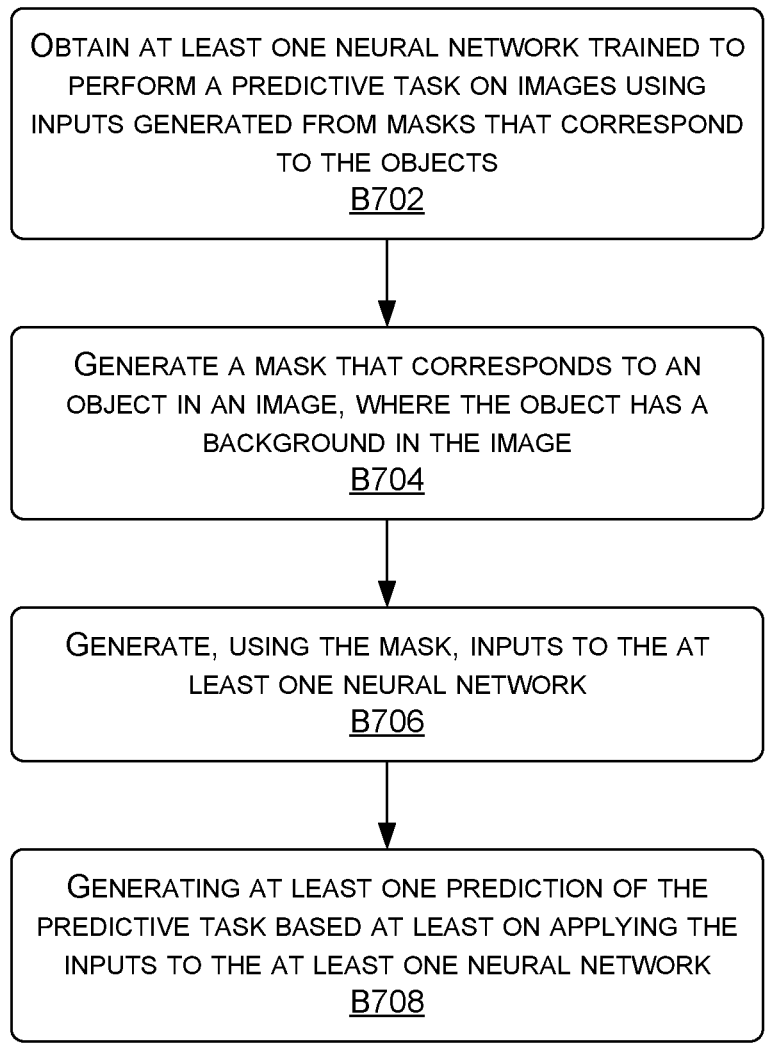
FIG. 7 is a flow diagram showing a method for inferencing using a machine learning model where inputs correspond to a mask of an image and at least a portion of the image, in accordance with some embodiments of the present disclosure.

Referring now to FIG. 7, FIG. 7 is a flow diagram showing a method 700 for inferencing using a machine learning model where inputs correspond to a mask of an image and at least a portion of the image, in accordance with some embodiments of the present disclosure. The method 700, at block B702 includes obtaining (or accessing) at least one neural network trained to perform a predictive task on images using inputs generated from masks that correspond to the objects. For example, the MLM(s) 122 of FIG. 5A or 5B may be obtained (accessed) and may have been trained according to the process 100 of FIG. 1.

The method 700, at block B704, includes generating a mask that corresponds to an object in an image, where the object has a background in the image. For example, the region identifier 204 may generate the segmentation mask 222 that corresponds to an object in the source image 220, where the object has a background in the source image 220.

The method 700, at block B706, includes generating, using the mask, inputs to the at least one neural network. For example, the input(s) 120 of FIG. 5A or 5B may be generated using the segmentation mask 222 (or without using object mask data). The input(s) 120 may capture the object with at least a portion of the background.

The method 700, at block B708, includes generating at least one prediction of the predictive task based at least on applying the inputs to the at least one neural network. For example, the MLM(s) 122 may be used to generate at least one prediction of the predictive task based at least on applying the inputs 120 to the MLM(s) 122 and the prediction data 126 may be determined using the output(s) 124 from the MLM(s) 122.

Figure 8:
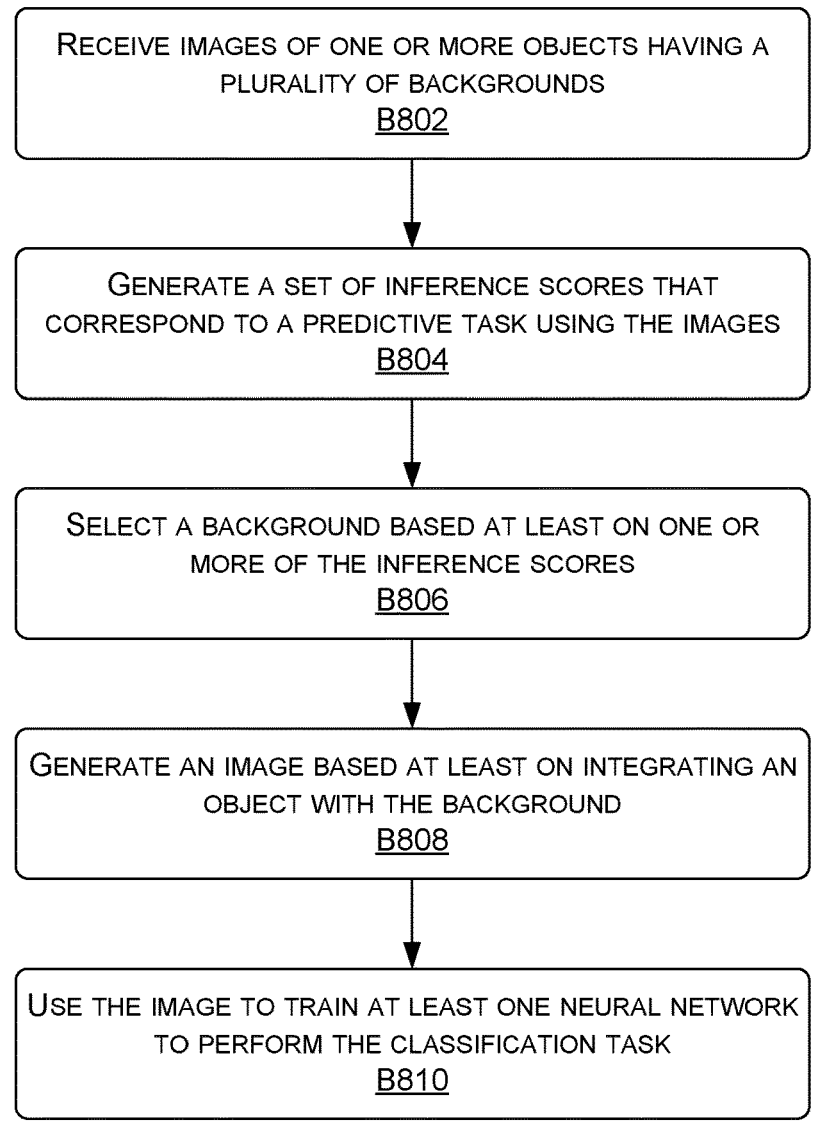
FIG. 8 is a flow diagram showing a method for selecting a background of an object for training one or more machine learning models, in accordance with some embodiments of the present disclosure.

Referring now to FIG. 8, FIG. 8 is a flow diagram showing a method 800 for selecting a background of an object for training one or more machine learning models, in accordance with some embodiments of the present disclosure. The method 800, at block B802, includes receiving images of one or more objects having a plurality of backgrounds. For example, the MLM training system 140 may receive images of one or more objects having a plurality of backgrounds 110.

The method 800, at block B804, includes generating a set of inference scores that correspond to a predictive task using the images. For example, the MLM trainer 104 may provide the inputs 120 to one or more of the MLM(s) 122 (or a different MLM) to generate the outputs 124 and the MLM post-processor 106 may process the output(s) 124 to produce prediction data 126.

The method 800, at block B806, includes selecting a background based at least on one or more of the inference scores. For example, the background selector 108 may select one or more of the backgrounds 110 based at least on the prediction data 126.

The method 800, at block B808, includes generating an images based at least on integrating an object with the background. For example, the background integrator 102 may generate an image based at least on integrating an object with the background (e.g., using an object image 112 and a background 110).

The method 800, at block B810, includes using the image to train at least one neural network to perform the predictive task. For example, the MLM trainer 104 may use the image to train one or more of the MLM(s) 122.

Example Computing Device

Figure 9:
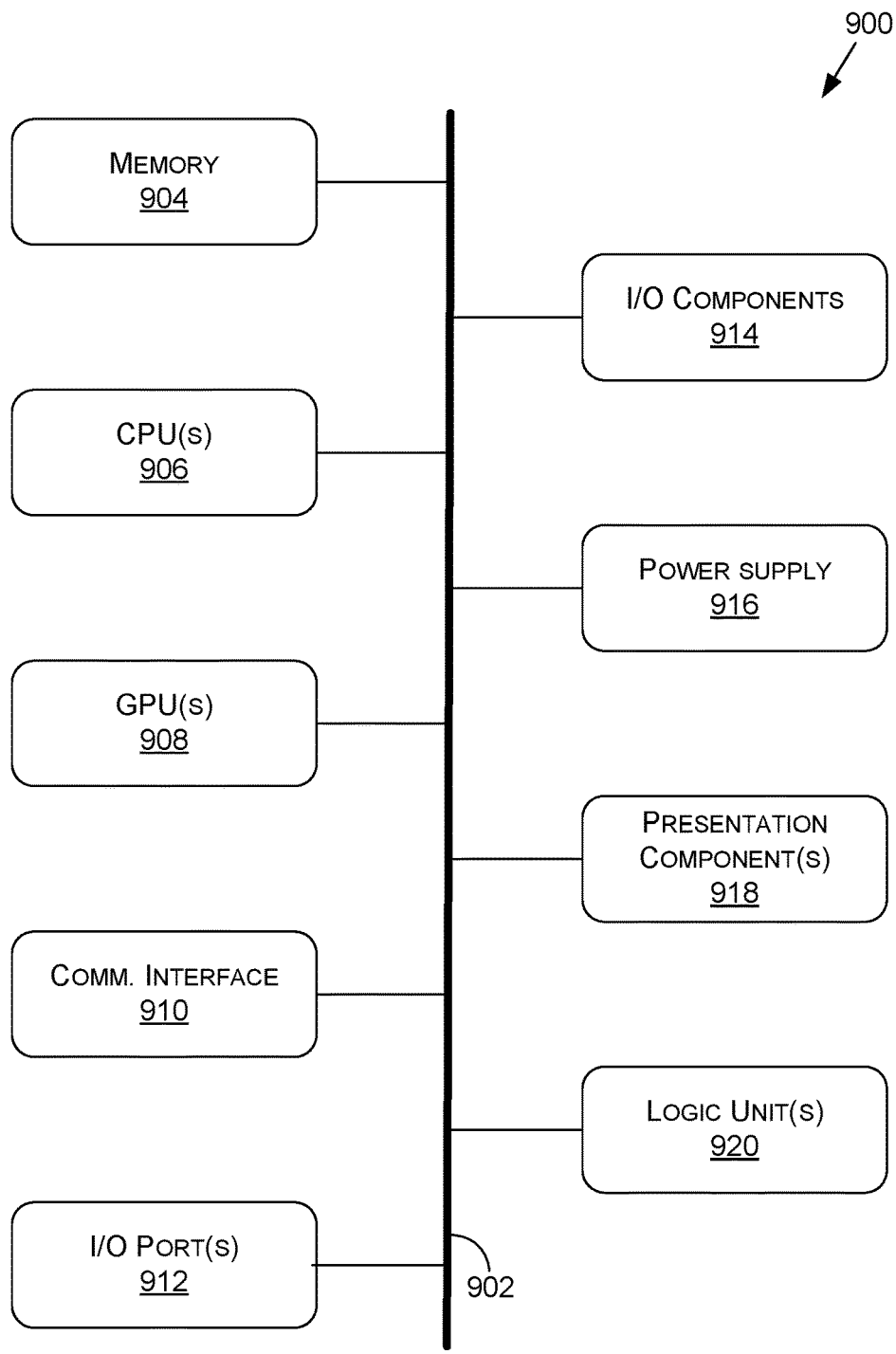
FIG. 9 is a block diagram of an example computing device suitable for use in implementing some embodiments of the present disclosure.

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920. In at least one embodiment, the computing device(s) 900 may comprise one or more virtual machines (VMs), and/or any of the components thereof may comprise virtual components (e.g., virtual hardware components). For non-limiting examples, one or more of the GPUs 908 may comprise one or more vGPUs, one or more of the CPUs 906 may comprise one or more vCPUs, and/or one or more of the logic units 920 may comprise one or more virtual logic units. As such, a computing device(s) 900 may include discrete components (e.g., a full GPU dedicated to the computing device 900), virtual components (e.g., a portion of a GPU dedicated to the computing device 900), or a combination thereof.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, etc.), and output the data (e.g., as an image, video, sound, etc.).

Example Data Center

Figure 10:
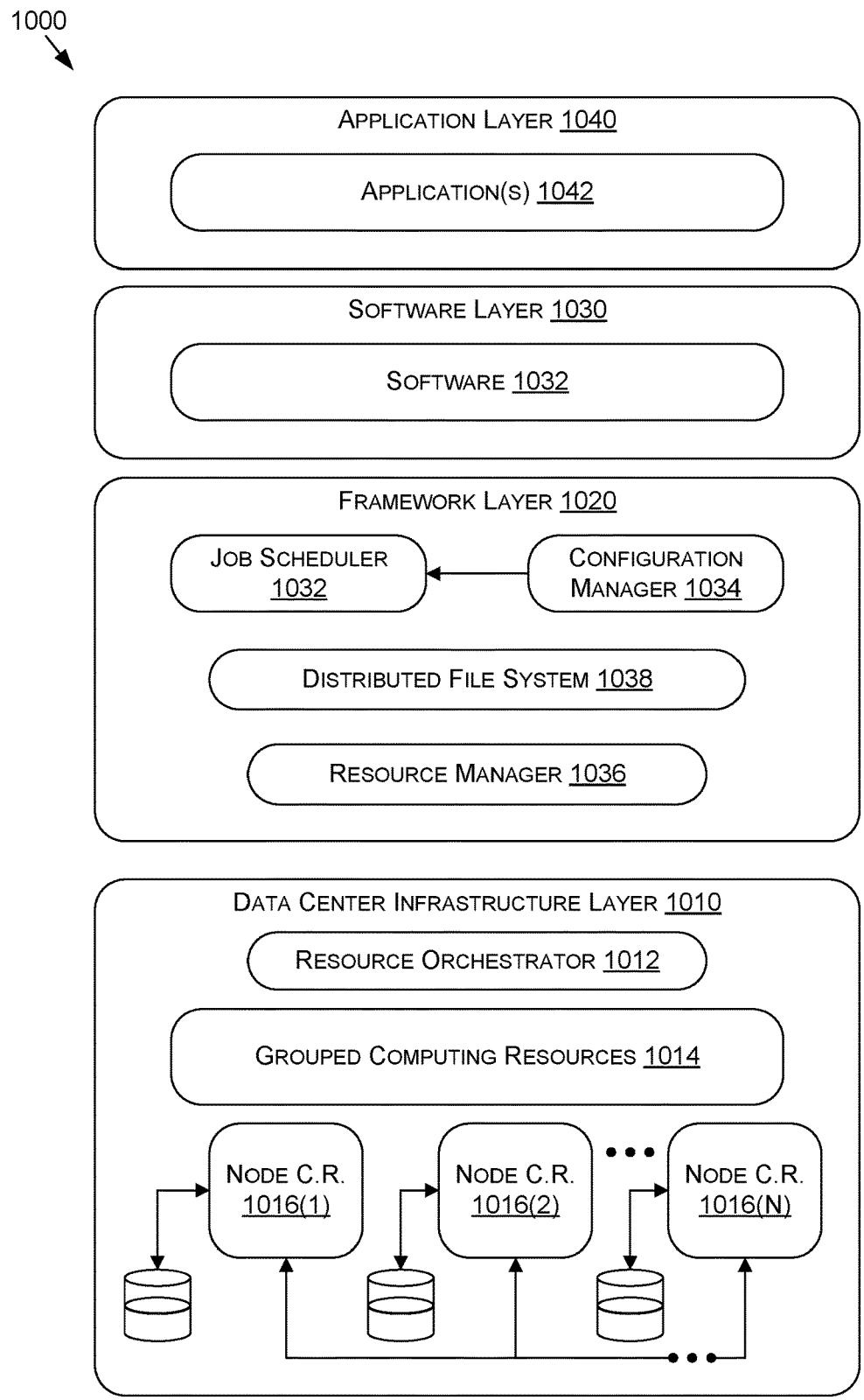
FIG. 10 is a block diagram of an example data center suitable for use in implementing some embodiments of the present disclosure.

FIG. 10 illustrates an example data center 1000 that may be used in at least one embodiments of the present disclosure. The data center 1000 may include a data center infrastructure layer 1010, a framework layer 1020, a software layer 1030, and/or an application layer 1040.

As shown in FIG. 10, the data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units ("CPUs") or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output ("NW I/O") devices, network switches, virtual machines ("VMs"), power modules, and/or cooling modules, etc. In some embodiments, one or more node C.R.s from among node C.R.s 1016(1)-1016(N) may correspond to a server having one or more of the above-mentioned computing resources. In addition, in some embodiments, the node C.R.s 1016(1)-10161(N) may include one or more virtual components, such as vGPUs, vCPUs, and/or the like, and/or one or more of the node C.R.s 1016(1)-1016(N) may correspond to a virtual machine (VM).

In at least one embodiment, grouped computing resources 1014 may include separate groupings of node C.R.s 1016 housed within one or more racks (not shown), or many racks housed in data centers at various geographical locations (also not shown). Separate groupings of node C.R.s 1016 within grouped computing resources 1014 may include grouped compute, network, memory or storage resources that may be configured or allocated to support one or more workloads. In at least one embodiment, several node C.R.s 1016 including CPUs, GPUs, and/or other processors may be grouped within one or more racks to provide compute resources to support one or more workloads. The one or more racks may also include any number of power modules, cooling modules, and/or network switches, in any combination.

The resource orchestrator 1022 may configure or otherwise control one or more node C.R.s 1016(1)-1016(N) and/or grouped computing resources 1014. In at least one embodiment, resource orchestrator 1022 may include a software design infrastructure ("SDI") management entity for the data center 1000. The resource orchestrator 1022 may include hardware, software, or some combination thereof.

In at least one embodiment, as shown in FIG. 10, framework layer 1020 may include a job scheduler 1032, a configuration manager 1034, a resource manager 1036, and/or a distributed file system 1038. The framework layer 1020 may include a framework to support software 1032 of software layer 1030 and/or one or more application(s) 1042 of application layer 1040. The software 1032 or application(s) 1042 may respectively include web-based service software or applications, such as those provided by Amazon Web Services, Google Cloud and Microsoft Azure. The framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1032 may include a Spark driver to facilitate scheduling of workloads supported by various layers of data center 1000. The configuration manager 1034 may be capable of configuring different layers such as software layer 1030 and framework layer 1020 including Spark and distributed file system 1038 for supporting large-scale data processing. The resource manager 1036 may be capable of managing clustered or grouped computing resources mapped to or allocated for support of distributed file system 1038 and job scheduler 1032. In at least one embodiment, clustered or grouped computing resources may include grouped computing resource 1014 at data center infrastructure layer 1010. The resource manager 1036 may coordinate with resource orchestrator 1012 to manage these mapped or allocated computing resources.

In at least one embodiment, software 1032 included in software layer 1030 may include software used by at least portions of node C.R.s 1016(1)-1016(N), grouped computing resources 1014, and/or distributed file system 1038 of framework layer 1020. One or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016(1)-1016(N), grouped computing resources 1014, and/or distributed file system 1038 of framework layer 1020. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1034, resource manager 1036, and resource orchestrator 1012 may implement any number and type of self-modifying actions based on any amount and type of data acquired in any technically feasible fashion. Self-modifying actions may relieve a data center operator of data center 1000 from making possibly bad configuration decisions and possibly avoiding underutilized and/or poor performing portions of a data center.

The data center 1000 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1000. In at least one embodiment, trained or deployed machine learning models corresponding to one or more neural networks may be used to infer or predict information using resources described above with respect to the data center 1000 by using weight parameters calculated through one or more training techniques, such as but not limited to those described herein.

In at least one embodiment, the data center 1000 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 900 of FIG. 9—e.g., each device may include similar components, features, and/or functionality of the computing device(s) 900. In addition, where backend devices (e.g., servers, NAS, etc.) are implemented, the backend devices may be included as part of a data center 1000, an example of which is described in more detail herein with respect to FIG. 10.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 900 described herein with respect to FIG. 9. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Example Autonomous Vehicle

Figure 11A:
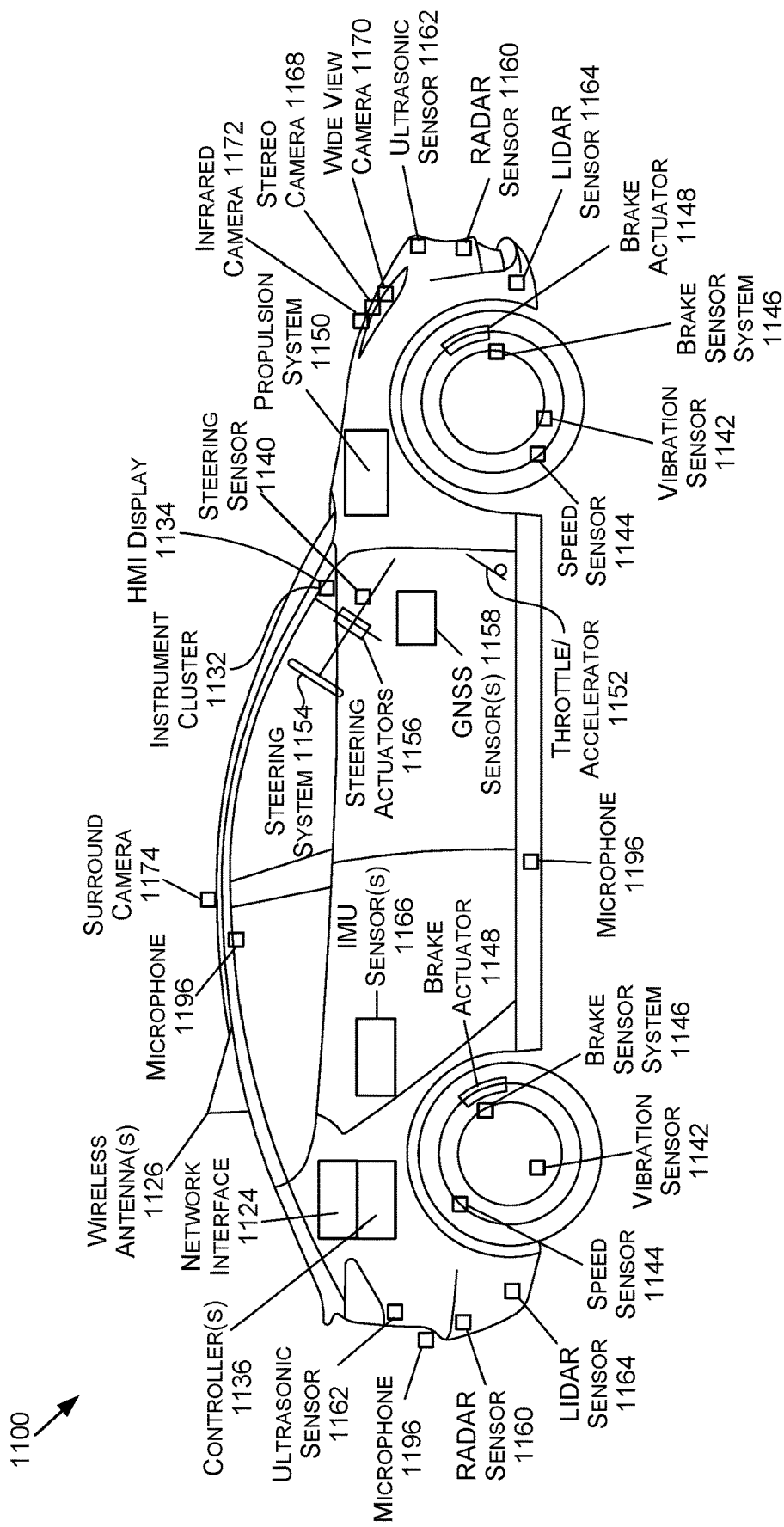
FIG. 11A is an illustration of an example autonomous vehicle, in accordance with some embodiments of the present disclosure.

FIG. 11A is an illustration of an example autonomous vehicle 1100, in accordance with some embodiments of the present disclosure. The autonomous vehicle 1100 (alternatively referred to herein as the "vehicle 1100") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1100 may be capable of functionality in accordance with one or more of Level 3-Level 5 of the autonomous driving levels. For example, the vehicle 1100 may be capable of conditional automation (Level 3), high automation (Level 4), and/or full automation (Level 5), depending on the embodiment.

The vehicle 1100 may include components such as a chassis, a vehicle body, wheels (e.g., 2, 4, 6, 8, 18, etc.), tires, axles, and other components of a vehicle. The vehicle 1100 may include a propulsion system 1150, such as an internal combustion engine, hybrid electric power plant, an all-electric engine, and/or another propulsion system type. The propulsion system 1150 may be connected to a drive train of the vehicle 1100, which may include a transmission, to enable the propulsion of the vehicle 1100. The propulsion system 1150 may be controlled in response to receiving signals from the throttle/accelerator 1152.

A steering system 1154, which may include a steering wheel, may be used to steer the vehicle 1100 (e.g., along a desired path or route) when the propulsion system 1150 is operating (e.g., when the vehicle is in motion). The steering system 1154 may receive signals from a steering actuator 1156. The steering wheel may be optional for full automation (Level 5) functionality.

The brake sensor system 1146 may be used to operate the vehicle brakes in response to receiving signals from the brake actuators 1148 and/or brake sensors.

Controller(s) 1136, which may include one or more system on chips (SoCs) 1104 (FIG. 11C) and/or GPU(s), may provide signals (e.g., representative of commands) to one or more components and/or systems of the vehicle 1100. For example, the controller(s) may send signals to operate the vehicle brakes via one or more brake actuators 1148, to operate the steering system 1154 via one or more steering actuators 1156, to operate the propulsion system 1150 via one or more throttle/accelerators 1152. The controller(s) 1136 may include one or more onboard (e.g., integrated) computing devices (e.g., supercomputers) that process sensor signals, and output operation commands (e.g., signals representing commands) to enable autonomous driving and/ or to assist a human driver in driving the vehicle 1100. The controller(s) 1136 may include a first controller 1136 for autonomous driving functions, a second controller 1136 for functional safety functions, a third controller 1136 for artificial intelligence functionality (e.g., computer vision), a fourth controller 1136 for infotainment functionality, a fifth controller 1136 for redundancy in emergency conditions, and/or other controllers. In some examples, a single controller 1136 may handle two or more of the above functionalities, two or more controllers 1136 may handle a single functionality, and/or any combination thereof.

The controller(s) 1136 may provide the signals for controlling one or more components and/or systems of the vehicle 1100 in response to sensor data received from one or more sensors (e.g., sensor inputs). The sensor data may be received from, for example and without limitation, global navigation satellite systems sensor(s) 1158 (e.g., Global Positioning System sensor(s)), RADAR sensor(s) 1160, ultrasonic sensor(s) 1162, LIDAR sensor(s) 1164, inertial measurement unit (IMU) sensor(s) 1166 (e.g., accelerometer(s), gyroscope(s), magnetic compass(es), magnetometer(s), etc.), microphone(s) 1196, stereo camera(s) 1168, wide-view camera(s) 1170 (e.g., fisheye cameras), infrared camera(s) 1172, surround camera(s) 1174 (e.g., 360 degree cameras), long-range and/or mid-range camera(s) 1198, speed sensor(s) 1144 (e.g., for measuring the speed of the vehicle 1100), vibration sensor(s) 1142, steering sensor(s) 1140, brake sensor(s) (e.g., as part of the brake sensor system 1146), and/or other sensor types.

One or more of the controller(s) 1136 may receive inputs (e.g., represented by input data) from an instrument cluster 1132 of the vehicle 1100 and provide outputs (e.g., represented by output data, display data, etc.) via a human-machine interface (HMI) display 1134, an audible annunciator, a loudspeaker, and/or via other components of the vehicle 1100. The outputs may include information such as vehicle velocity, speed, time, map data (e.g., the HD map 1122 of FIG. 11C), location data (e.g., the vehicle's 1100 location, such as on a map), direction, location of other vehicles (e.g., an occupancy grid), information about objects and status of objects as perceived by the controller(s) 1136, etc. For example, the HMI display 1134 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1100 further includes a network interface 1124 which may use one or more wireless antenna(s) 1126 and/or modem(s) to communicate over one or more networks. For example, the network interface 1124 may be capable of communication over LTE, WCDMA, UMTS, GSM, CDMA2000, etc. The wireless antenna(s) 1126 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LP-WANs), such as LoRaWAN, SigFox, etc.

Figure 11B:
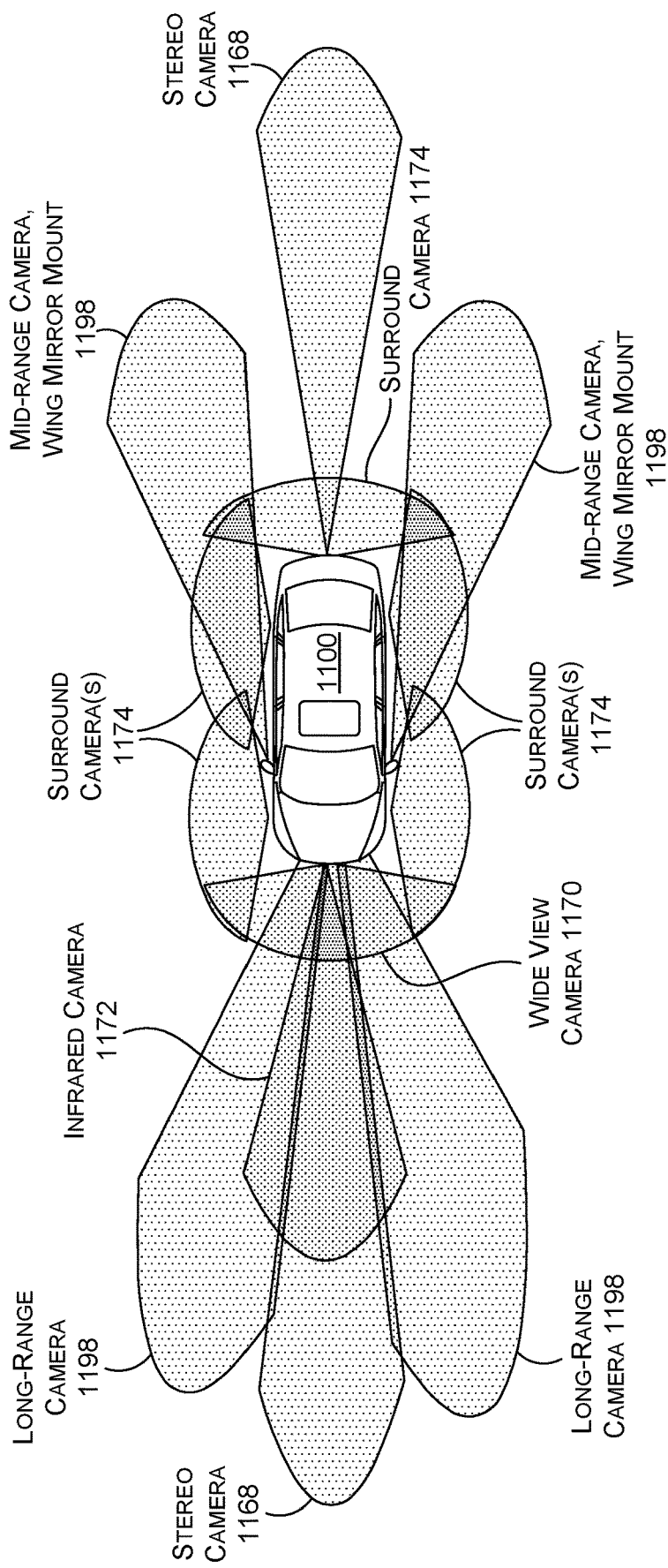
FIG. 11B is an example of camera locations and fields of view for the example autonomous vehicle of FIG. 11A, in accordance with some embodiments of the present disclosure.

FIG. 11B is an example of camera locations and fields of view for the example autonomous vehicle 1100 of FIG. 11A, in accordance with some embodiments of the present disclosure. The cameras and respective fields of view are one example embodiment and are not intended to be limiting. For example, additional and/or alternative cameras may be included and/or the cameras may be located at different locations on the vehicle 1100.

The camera types for the cameras may include, but are not limited to, digital cameras that may be adapted for use with the components and/or systems of the vehicle 1100. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1100 (e.g., front-facing cameras) may be used for surround view, to help identify forward facing paths and obstacles, as well aid in, with the help of one or more controllers 1136 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1170 that may be used to perceive objects coming into view from the periphery (e.g., pedestrians, crossing traffic or bicycles). Although only one wide-view camera is illustrated in FIG. 11B, there may any number of wide-view cameras 1170 on the vehicle 1100. In addition, long-range camera(s) 1198 (e.g., a long-view stereo camera pair) may be used for depth-based object detection, especially for objects for which a neural network has not yet been trained. The long-range camera(s) 1198 may also be used for object detection and classification, as well as basic object tracking.

One or more stereo cameras 1168 may also be included in a front-facing configuration. The stereo camera(s) 1168 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 1168 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1168 may be used in addition to, or alternatively from, those described herein.

Cameras with a field of view that include portions of the environment to the side of the vehicle 1100 (e.g., side-view cameras) may be used for surround view, providing information used to create and update the occupancy grid, as well as to generate side impact collision warnings. For example, surround camera(s) 1174 (e.g., four surround cameras 1174 as illustrated in FIG. 11B) may be positioned to on the vehicle 1100. The surround camera(s) 1174 may include wide-view camera(s) 1170, fisheye camera(s), 360 degree camera(s), and/or the like. Four example, four fisheye cameras may be positioned on the vehicle's front, rear, and sides. In an alternative arrangement, the vehicle may use three surround camera(s) 1174 (e.g., left, right, and rear), and may leverage one or more other camera(s) (e.g., a forward-facing camera) as a fourth surround view camera.

Cameras with a field of view that include portions of the environment to the rear of the vehicle 1100 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1198, stereo camera(s) 1168), infrared camera(s) 1172, etc.), as described herein.

Figure 11C:
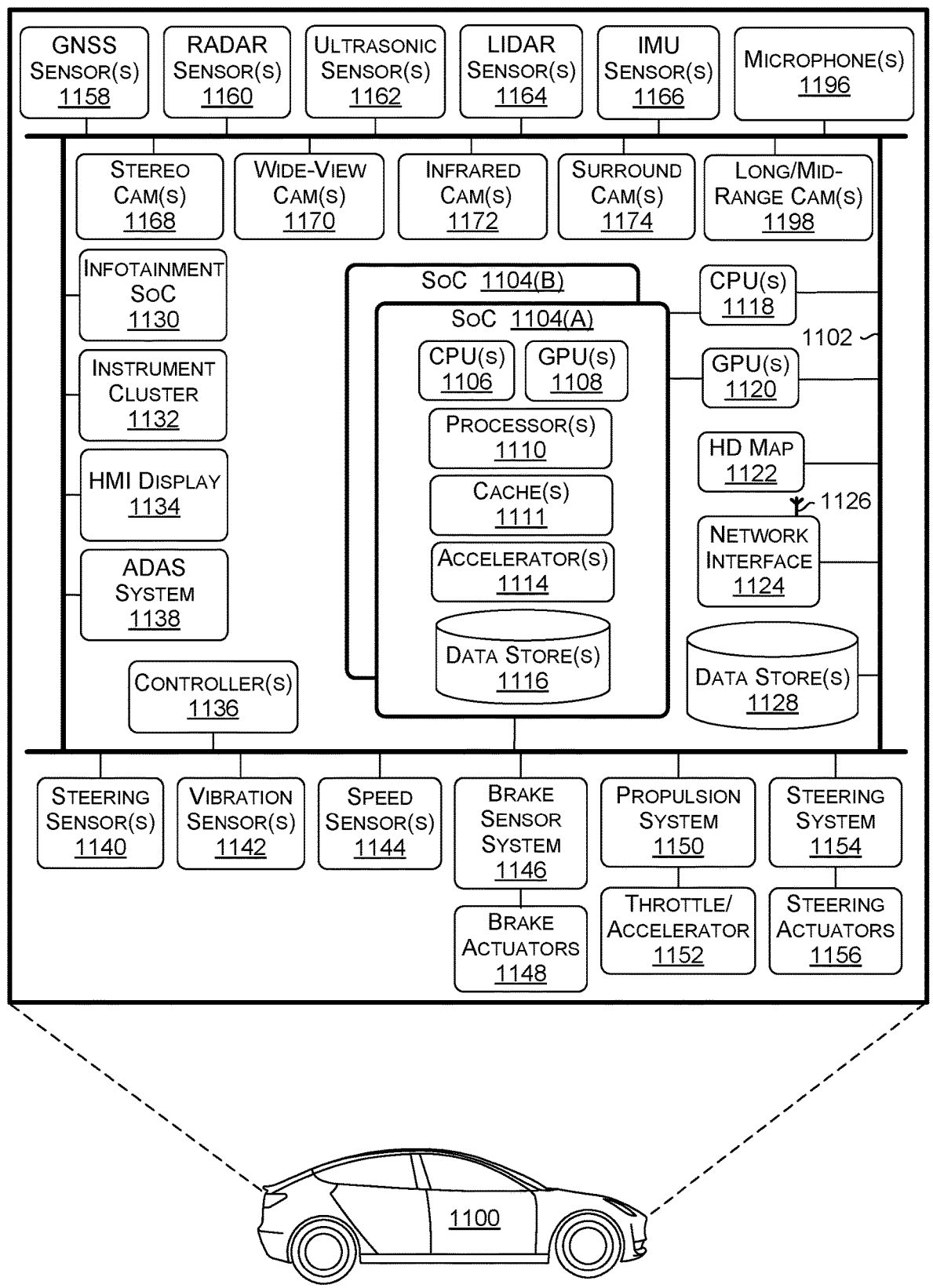
FIG. 11C is a block diagram of an example system architecture for the example autonomous vehicle of FIG. 11A, in accordance with some embodiments of the present disclosure.

FIG. 11C is a block diagram of an example system architecture for the example autonomous vehicle 1100 of FIG. 11A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1100 in FIG. 11C are illustrated as being connected via bus 1102. The bus 1102 may include a Controller Area Network (CAN) data interface (alternatively referred to herein as a "CAN bus"). A CAN may be a network inside the vehicle 1100 used to aid in control of various features and functionality of the vehicle 1100, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1102 is described herein as being a CAN bus, this is not intended to be limiting. For example, in addition to, or alternatively from, the CAN bus, FlexRay and/or Ethernet may be used. Additionally, although a single line is used to represent the bus 1102, this is not intended to be limiting. For example, there may be any number of busses 1102, which may include one or more CAN busses, one or more FlexRay busses, one or more Ethernet busses, and/or one or more other types of busses using a different protocol. In some examples, two or more busses 1102 may be used to perform different functions, and/or may be used for redundancy. For example, a first bus 1102 may be used for collision avoidance functionality and a second bus 1102 may be used for actuation control. In any example, each bus 1102 may communicate with any of the components of the vehicle 1100, and two or more busses 1102 may communicate with the same components. In some examples, each SoC 1104, each controller 1136, and/or each computer within the vehicle may have access to the same input data (e.g., inputs from sensors of the vehicle 1100), and may be connected to a common bus, such the CAN bus.

The vehicle 1100 may include one or more controller(s) 1136, such as those described herein with respect to FIG. 11A. The controller(s) 1136 may be used for a variety of functions. The controller(s) 1136 may be coupled to any of the various other components and systems of the vehicle 1100, and may be used for control of the vehicle 1100, artificial intelligence of the vehicle 1100, infotainment for the vehicle 1100, and/or the like.

The vehicle 1100 may include a system(s) on a chip (SoC) 1104. The SoC 1104 may include CPU(s) 1106, GPU(s) 1108, processor(s) 1110, cache(s) 1112, accelerator(s) 1114, data store(s) 1116, and/or other components and features not illustrated. The SoC(s) 1104 may be used to control the vehicle 1100 in a variety of platforms and systems. For example, the SoC(s) 1104 may be combined in a system (e.g., the system of the vehicle 1100) with an HD map 1122 which may obtain map refreshes and/or updates via a network interface 1124 from one or more servers (e.g., server(s) 1178 of FIG. 11D).

The CPU(s) 1106 may include a CPU cluster or CPU complex (alternatively referred to herein as a "CCPLEX"). The CPU(s) 1106 may include multiple cores and/or L2 caches. For example, in some embodiments, the CPU(s) 1106 may include eight cores in a coherent multi-processor configuration. In some embodiments, the CPU(s) 1106 may include four dual-core clusters where each cluster has a dedicated L2 cache (e.g., a 2 MB L2 cache). The CPU(s) 1106 (e.g., the CCPLEX) may be configured to support simultaneous cluster operation enabling any combination of the clusters of the CPU(s) 1106 to be active at any given time.

The CPU(s) 1106 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1106 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1108 may include an integrated GPU (alternatively referred to herein as an "iGPU"). The GPU(s) 1108 may be programmable and may be efficient for parallel workloads. The GPU(s) 1108, in some examples, may use an enhanced tensor instruction set. The GPU(s) 1108 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1108 may include at least eight streaming microprocessors. The GPU(s) 1108 may use compute application programming interface(s) (API(s)). In addition, the GPU(s) 1108 may use one or more parallel computing platforms and/or programming models (e.g., NVIDIA's CUDA).

The GPU(s) 1108 may be power-optimized for best performance in automotive and embedded use cases. For example, the GPU(s) 1108 may be fabricated on a Fin field-effect transistor (FinFET). However, this is not intended to be limiting and the GPU(s) 1108 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1108 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1108 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1108 to access the CPU(s) 1106 page tables directly. In such examples, when the GPU(s) 1108 memory management unit (MMU) experiences a miss, an address translation request may be transmitted to the CPU(s) 1106. In response, the CPU(s) 1106 may look in its page tables for the virtual-to-physical mapping for the address and transmits the translation back to the GPU(s) 1108. As such, unified memory technology may allow a single unified virtual address space for memory of both the CPU(s) 1106 and the GPU(s) 1108, thereby simplifying the GPU(s) 1108 programming and porting of applications to the GPU(s) 1108.

In addition, the GPU(s) 1108 may include an access counter that may keep track of the frequency of access of the GPU(s) 1108 to memory of other processors. The access counter may help ensure that memory pages are moved to the physical memory of the processor that is accessing the pages most frequently.

The SoC(s) 1104 may include any number of cache(s) 1112, including those described herein. For example, the cache(s) 1112 may include an L3 cache that is available to both the CPU(s) 1106 and the GPU(s) 1108 (e.g., that is connected both the CPU(s) 1106 and the GPU(s) 1108). The cache(s) 1112 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1104 may include an arithmetic logic unit(s) (ALU(s)) which may be leveraged in performing processing with respect to any of the variety of tasks or operations of the vehicle 1100—such as processing DNNs. In addition, the SoC(s) 1104 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1106 and/or GPU(s) 1108.

The SoC(s) 1104 may include one or more accelerators 1114 (e.g., hardware accelerators, software accelerators, or a combination thereof). For example, the SoC(s) 1104 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1108 and to off-load some of the tasks of the GPU(s) 1108 (e.g., to free up more cycles of the GPU(s) 1108 for performing other tasks). As an example, the accelerator(s) 1114 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1114 (e.g., the hardware acceleration cluster) may include a deep learning accelerator(s) (DLA).

The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1108, and by using an inference accelerator, for example, a designer may target either the DLA(s) or the GPU(s) 1108 for any function. For example, the designer may focus processing of CNNs and floating point operations on the DLA(s) and leave other functions to the GPU(s) 1108 and/or other accelerator(s) 1114.

The accelerator(s) 1114 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1106. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMM), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1114 (e.g., the hardware acceleration cluster) may include a computer vision network on-chip and SRAM, for providing a high-bandwidth, low latency SRAM for the accelerator(s) 1114. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1104 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1114 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1166 output that correlates with the vehicle 1100 orientation, distance, 3D location estimates of the object obtained from the neural network and/or other sensors (e.g., LIDAR sensor(s) 1164 or RADAR sensor(s) 1160), among others.

The SoC(s) 1104 may include data store(s) 1116 (e.g., memory). The data store(s) 1116 may be on-chip memory of the SoC(s) 1104, which may store neural networks to be executed on the GPU and/or the DLA. In some examples, the data store(s) 1116 may be large enough in capacity to store multiple instances of neural networks for redundancy and safety. The data store(s) 1112 may comprise L2 or L3 cache(s) 1112. Reference to the data store(s) 1116 may include reference to the memory associated with the PVA, DLA, and/or other accelerator(s) 1114, as described herein.

The SoC(s) 1104 may include one or more processor(s) 1110 (e.g., embedded processors). The processor(s) 1110 may include a boot and power management processor that may be a dedicated processor and subsystem to handle boot power and management functions and related security enforcement. The boot and power management processor may be a part of the SoC(s) 1104 boot sequence and may provide runtime power management services. The boot power and management processor may provide clock and voltage programming, assistance in system low power state transitions, management of SoC(s) 1104 thermals and temperature sensors, and/or management of the SoC(s) 1104 power states. Each temperature sensor may be implemented as a ring-oscillator whose output frequency is proportional to temperature, and the SoC(s) 1104 may use the ring-oscillators to detect temperatures of the CPU(s) 1106, GPU(s) 1108, and/or accelerator(s) 1114. If temperatures are determined to exceed a threshold, the boot and power management processor may enter a temperature fault routine and put the SoC(s) 1104 into a lower power state and/or put the vehicle 1100 into a chauffeur to safe stop mode (e.g., bring the vehicle 1100 to a safe stop).

The processor(s) 1110 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1110 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1110 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1110 may further include a real-time camera engine that may include a dedicated processor subsystem for handling real-time camera management.

The processor(s) 1110 may further include a high-dynamic range signal processor that may include an image signal processor that is a hardware engine that is part of the camera processing pipeline.

The processor(s) 1110 may include a video image compositor that may be a processing block (e.g., implemented on a microprocessor) that implements video post-processing functions needed by a video playback application to produce the final image for the player window. The video image compositor may perform lens distortion correction on wide-view camera(s) 1170, surround camera(s) 1174, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1108 is not required to continuously render new surfaces. Even when the GPU(s) 1108 is powered on and active doing 3D rendering, the video image compositor may be used to offload the GPU(s) 1108 to improve performance and responsiveness.

The SoC(s) 1104 may further include a mobile industry processor interface (MIPI) camera serial interface for receiving video and input from cameras, a high-speed interface, and/or a video input block that may be used for camera and related pixel input functions. The SoC(s) 1104 may further include an input/output controller(s) that may be controlled by software and may be used for receiving I/O signals that are uncommitted to a specific role.

The SoC(s) 1104 may further include a broad range of peripheral interfaces to enable communication with peripherals, audio codecs, power management, and/or other devices. The SoC(s) 1104 may be used to process data from cameras (e.g., connected over Gigabit Multimedia Serial Link and Ethernet), sensors (e.g., LIDAR sensor(s) 1164, RADAR sensor(s) 1160, etc. that may be connected over Ethernet), data from bus 1102 (e.g., speed of vehicle 1100, steering wheel position, etc.), data from GNSS sensor(s) 1158 (e.g., connected over Ethernet or CAN bus). The SoC(s) 1104 may further include dedicated high-performance mass storage controllers that may include their own DMA engines, and that may be used to free the CPU(s) 1106 from routine data management tasks.

The SoC(s) 1104 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1104 may be faster, more reliable, and even more energy-efficient and space-efficient than conventional systems. For example, the accelerator(s) 1114, when combined with the CPU(s) 1106, the GPU(s) 1108, and the data store(s) 1116, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1120) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1108.

In some examples, a CNN for facial recognition and vehicle owner identification may use data from camera sensors to identify the presence of an authorized driver and/or owner of the vehicle 1100. The always on sensor processing engine may be used to unlock the vehicle when the owner approaches the driver door and turn on the lights, and, in security mode, to disable the vehicle when the owner leaves the vehicle. In this way, the SoC(s) 1104 provide for security against theft and/or carjacking.

In another example, a CNN for emergency vehicle detection and identification may use data from microphones 1196 to detect and identify emergency vehicle sirens. In contrast to conventional systems, that use general classifiers to detect sirens and manually extract features, the SoC(s) 1104 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1158. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1162, until the emergency vehicle(s) passes.

The vehicle may include a CPU(s) 1118 (e.g., discrete CPU(s), or dCPU(s)), that may be coupled to the SoC(s) 1104 via a high-speed interconnect (e.g., PCIe). The CPU(s) 1118 may include an X86 processor, for example. The CPU(s) 1118 may be used to perform any of a variety of functions, including arbitrating potentially inconsistent results between ADAS sensors and the SoC(s) 1104, and/or monitoring the status and health of the controller(s) 1136 and/or infotainment SoC 1130, for example.

The vehicle 1100 may include a GPU(s) 1120 (e.g., discrete GPU(s), or dGPU(s)), that may be coupled to the SoC(s) 1104 via a high-speed interconnect (e.g., NVIDIA's NVLINK). The GPU(s) 1120 may provide additional artificial intelligence functionality, such as by executing redundant and/or different neural networks, and may be used to train and/or update neural networks based on input (e.g., sensor data) from sensors of the vehicle 1100.

The vehicle 1100 may further include the network interface 1124 which may include one or more wireless antennas 1126 (e.g., one or more wireless antennas for different communication protocols, such as a cellular antenna, a Bluetooth antenna, etc.). The network interface 1124 may be used to enable wireless connectivity over the Internet with the cloud (e.g., with the server(s) 1178 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1100 information about vehicles in proximity to the vehicle 1100 (e.g., vehicles in front of, on the side of, and/or behind the vehicle 1100). This functionality may be part of a cooperative adaptive cruise control functionality of the vehicle 1100.

The network interface 1124 may include a SoC that provides modulation and demodulation functionality and enables the controller(s) 1136 to communicate over wireless networks. The network interface 1124 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1100 may further include data store(s) 1128 which may include off-chip (e.g., off the SoC(s) 1104) storage. The data store(s) 1128 may include one or more storage elements including RAM, SRAM, DRAM, VRAM, Flash, hard disks, and/or other components and/or devices that may store at least one bit of data.

The vehicle 1100 may further include GNSS sensor(s) 1158. The GNSS sensor(s) 1158 (e.g., GPS, assisted GPS sensors, differential GPS (DGPS) sensors, etc.), to assist in mapping, perception, occupancy grid generation, and/or path planning functions. Any number of GNSS sensor(s) 1158 may be used, including, for example and without limitation, a GPS using a USB connector with an Ethernet to Serial (RS-232) bridge.

The vehicle 1100 may further include RADAR sensor(s) 1160. The RADAR sensor(s) 1160 may be used by the vehicle 1100 for long-range vehicle detection, even in darkness and/or severe weather conditions. RADAR functional safety levels may be ASIL B. The RADAR sensor(s) 1160 may use the CAN and/or the bus 1102 (e.g., to transmit data generated by the RADAR sensor(s) 1160) for control and to access object tracking data, with access to Ethernet to access raw data in some examples. A wide variety of RADAR sensor types may be used. For example, and without limitation, the RADAR sensor(s) 1160 may be suitable for front, rear, and side RADAR use. In some example, Pulse Doppler RADAR sensor(s) are used.

The RADAR sensor(s) 1160 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1160 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1100 surroundings at higher speeds with minimal interference from traffic in adjacent lanes. The other two antennae may expand the field of view, making it possible to quickly detect vehicles entering or leaving the vehicle's 1100 lane.

Mid-range RADAR systems may include, as an example, a range of up to 1160 m (front) or 80 m (rear), and a field of view of up to 42 degrees (front) or 1150 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1100 may further include ultrasonic sensor(s) 1162. The ultrasonic sensor(s) 1162, which may be positioned at the front, back, and/or the sides of the vehicle 1100, may be used for park assist and/or to create and update an occupancy grid. A wide variety of ultrasonic sensor(s) 1162 may be used, and different ultrasonic sensor(s) 1162 may be used for different ranges of detection (e.g., 2.5 m, 4 m). The ultrasonic sensor(s) 1162 may operate at functional safety levels of ASIL B.

The vehicle 1100 may include LIDAR sensor(s) 1164. The LIDAR sensor(s) 1164 may be used for object and pedestrian detection, emergency braking, collision avoidance, and/or other functions. The LIDAR sensor(s) 1164 may be functional safety level ASIL B. In some examples, the vehicle 1100 may include multiple LIDAR sensors 1164 (e.g., two, four, six, etc.) that may use Ethernet (e.g., to provide data to a Gigabit Ethernet switch).

In some examples, the LIDAR sensor(s) 1164 may be capable of providing a list of objects and their distances for a 360-degree field of view. Commercially available LIDAR sensor(s) 1164 may have an advertised range of approximately 1100 m, with an accuracy of 2 cm-3 cm, and with support for an 1100 Mbps Ethernet connection, for example.

In some examples, one or more non-protruding LIDAR sensors 1164 may be used. In such examples, the LIDAR sensor(s) 1164 may be implemented as a small device that may be embedded into the front, rear, sides, and/or corners of the vehicle 1100. The LIDAR sensor(s) 1164, in such examples, may provide up to a 120-degree horizontal and 35-degree vertical field-of-view, with a 200 m range even for low-reflectivity objects. Front-mounted LIDAR sensor(s) 1164 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1100. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1164 may be less susceptible to motion blur, vibration, and/or shock.

The vehicle may further include IMU sensor(s) 1166. The IMU sensor(s) 1166 may be located at a center of the rear axle of the vehicle 1100, in some examples. The IMU sensor(s) 1166 may include, for example and without limitation, an accelerometer(s), a magnetometer(s), a gyroscope(s), a magnetic compass(es), and/or other sensor types. In some examples, such as in six-axis applications, the IMU sensor(s) 1166 may include accelerometers and gyroscopes, while in nine-axis applications, the IMU sensor(s) 1166 may include accelerometers, gyroscopes, and magnetometers.

In some embodiments, the IMU sensor(s) 1166 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1166 may enable the vehicle 1100 to estimate heading without requiring input from a magnetic sensor by directly observing and correlating the changes in velocity from GPS to the IMU sensor(s) 1166. In some examples, the IMU sensor(s) 1166 and the GNSS sensor(s) 1158 may be combined in a single integrated unit.

The vehicle may include microphone(s) 1196 placed in and/or around the vehicle 1100. The microphone(s) 1196 may be used for emergency vehicle detection and identification, among other things.

The vehicle may further include any number of camera types, including stereo camera(s) 1168, wide-view camera(s) 1170, infrared camera(s) 1172, surround camera(s) 1174, long-range and/or mid-range camera(s) 1198, and/or other camera types. The cameras may be used to capture image data around an entire periphery of the vehicle 1100. The types of cameras used depends on the embodiments and requirements for the vehicle 1100, and any combination of camera types may be used to provide the necessary coverage around the vehicle 1100. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 11A and FIG. 11B.

The vehicle 1100 may further include vibration sensor(s) 1142. The vibration sensor(s) 1142 may measure vibrations of components of the vehicle, such as the axle(s). For example, changes in vibrations may indicate a change in road surfaces. In another example, when two or more vibration sensors 1142 are used, the differences between the vibrations may be used to determine friction or slippage of the road surface (e.g., when the difference in vibration is between a power-driven axle and a freely rotating axle).

The vehicle 1100 may include an ADAS system 1138. The ADAS system 1138 may include a SoC, in some examples. The ADAS system 1138 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1160, LIDAR sensor(s) 1164, and/or a camera(s). The ACC systems may include longitudinal ACC and/or lateral ACC. Longitudinal ACC monitors and controls the distance to the vehicle immediately ahead of the vehicle 1100 and automatically adjust the vehicle speed to maintain a safe distance from vehicles ahead. Lateral ACC performs distance keeping, and advises the vehicle 1100 to change lanes when necessary. Lateral ACC is related to other ADAS applications such as LCA and CWS.

CACC uses information from other vehicles that may be received via the network interface 1124 and/or the wireless antenna(s) 1126 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1100), while the I2V communication concept provides information about traffic further ahead. CACC systems may include either or both I2V and V2V information sources. Given the information of the vehicles ahead of the vehicle 1100, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1160, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1160, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1100 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1100 if the vehicle 1100 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1160, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1100 is backing up. Some RCTW systems include AEB to ensure that the vehicle brakes are applied to avoid a crash. RCTW systems may use one or more rear-facing RADAR sensor(s) 1160, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1100, the vehicle 1100 itself must, in the case of conflicting results, decide whether to heed the result from a primary computer or a secondary computer (e.g., a first controller 1136 or a second controller 1136). For example, in some embodiments, the ADAS system 1138 may be a backup and/or secondary computer for providing perception information to a backup computer rationality module. The backup computer rationality monitor may run a redundant diverse software on hardware components to detect faults in perception and dynamic driving tasks. Outputs from the ADAS system 1138 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1104.

In other examples, ADAS system 1138 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1138 may be fed into the primary computer's perception block and/or the primary computer's dynamic driving task block. For example, if the ADAS system 1138 indicates a forward crash warning due to an object immediately ahead, the perception block may use this information when identifying objects. In other examples, the secondary computer may have its own neural network which is trained and thus reduces the risk of false positives, as described herein.

The vehicle 1100 may further include the infotainment SoC 1130 (e.g., an in-vehicle infotainment system (IVI)). Although illustrated and described as a SoC, the infotainment system may not be a SoC, and may include two or more discrete components. The infotainment SoC 1130 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1100. For example, the infotainment SoC 1130 may radios, disk players, navigation systems, video players, USB and Bluetooth connectivity, carputers, in-car entertainment, Wi-Fi, steering wheel audio controls, hands free voice control, a heads-up display (HUD), an HMI display 1134, a telematics device, a control panel (e.g., for controlling and/or interacting with various components, features, and/or systems), and/or other components. The infotainment SoC 1130 may further be used to provide information (e.g., visual and/or audible) to a user(s) of the vehicle, such as information from the ADAS system 1138, autonomous driving information such as planned vehicle maneuvers, trajectories, surrounding environment information (e.g., intersection information, vehicle information, road information, etc.), and/or other information.

The infotainment SoC 1130 may include GPU functionality. The infotainment SoC 1130 may communicate over the bus 1102 (e.g., CAN bus, Ethernet, etc.) with other devices, systems, and/or components of the vehicle 1100. In some examples, the infotainment SoC 1130 may be coupled to a supervisory MCU such that the GPU of the infotainment system may perform some self-driving functions in the event that the primary controller(s) 1136 (e.g., the primary and/or backup computers of the vehicle 1100) fail. In such an example, the infotainment SoC 1130 may put the vehicle 1100 into a chauffeur to safe stop mode, as described herein.

The vehicle 1100 may further include an instrument cluster 1132 (e.g., a digital dash, an electronic instrument cluster, a digital instrument panel, etc.). The instrument cluster 1132 may include a controller and/or supercomputer (e.g., a discrete controller or supercomputer). The instrument cluster 1132 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1130 and the instrument cluster 1132. In other words, the instrument cluster 1132 may be included as part of the infotainment SoC 1130, or vice versa.

Figure 11D:
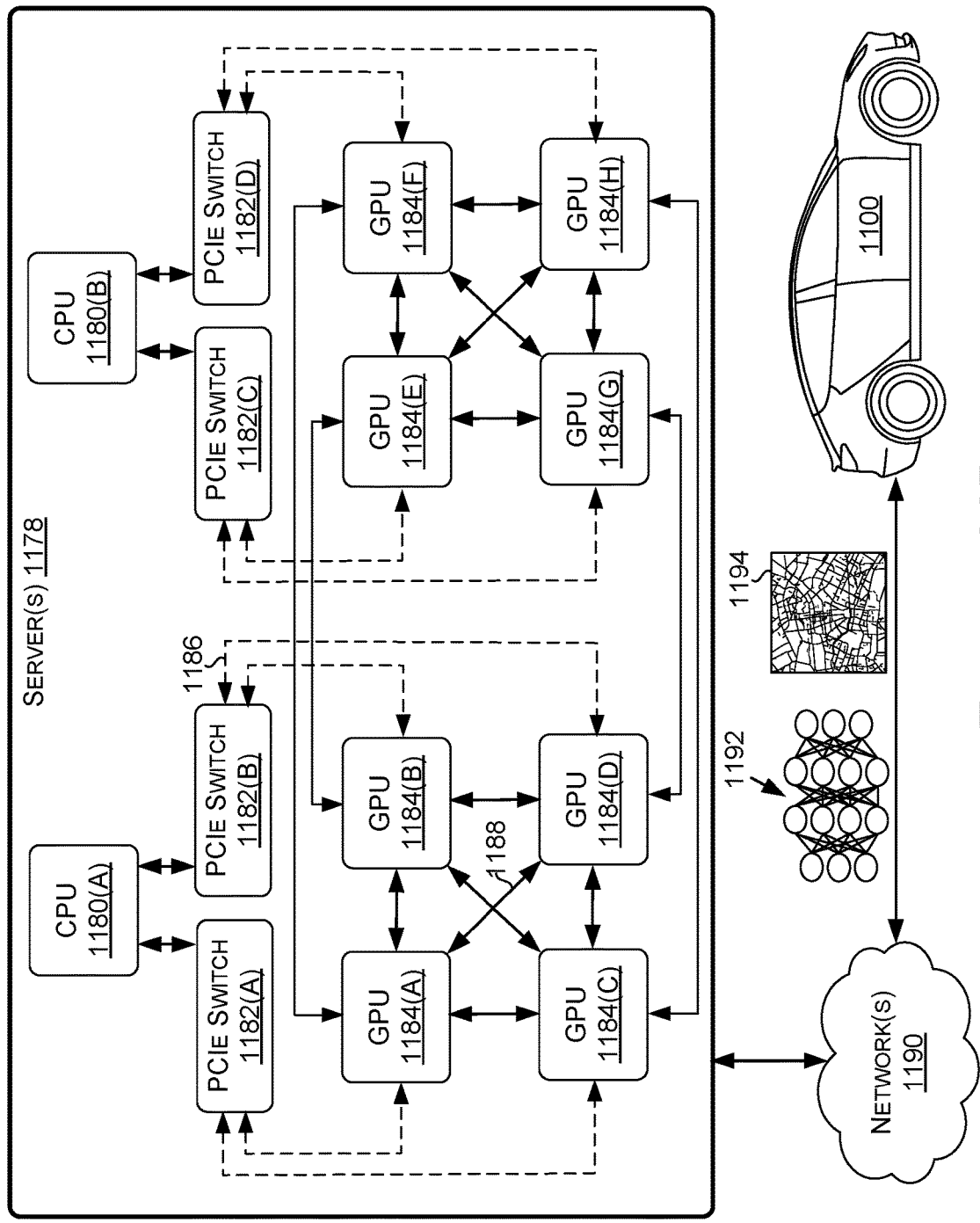
FIG. 11D is a system diagram for communication between cloud-based server(s) and the example autonomous vehicle of FIG. 11A, in accordance with some embodiments of the present disclosure.

FIG. 11D is a system diagram for communication between cloud-based server(s) and the example autonomous vehicle 1100 of FIG. 11A, in accordance with some embodiments of the present disclosure. The system 1176 may include server(s) 1178, network(s) 1190, and vehicles, including the vehicle 1100. The server(s) 1178 may include a plurality of GPUs 1184(A)-1184(H) (collectively referred to herein as GPUs 1184), PCIe switches 1182(A)-1182(H) (collectively referred to herein as PCIe switches 1182), and/or CPUs 1180(A)-1180(B) (collectively referred to herein as CPUs 1180). The GPUs 1184, the CPUs 1180, and the PCIe switches may be interconnected with high-speed interconnects such as, for example and without limitation, NVLink interfaces 1188 developed by NVIDIA and/or PCIe connections 1186. In some examples, the GPUs 1184 are connected via NVLink and/or NVSwitch SoC and the GPUs 1184 and the PCIe switches 1182 are connected via PCIe interconnects. Although eight GPUs 1184, two CPUs 1180, and two PCIe switches are illustrated, this is not intended to be limiting. Depending on the embodiment, each of the server(s) 1178 may include any number of GPUs 1184, CPUs 1180, and/or PCIe switches. For example, the server(s) 1178 may each include eight, sixteen, thirty-two, and/or more GPUs 1184.

The server(s) 1178 may receive, over the network(s) 1190 and from the vehicles, image data representative of images showing unexpected or changed road conditions, such as recently commenced road-work. The server(s) 1178 may transmit, over the network(s) 1190 and to the vehicles, neural networks 1192, updated neural networks 1192, and/or map information 1194, including information regarding traffic and road conditions. The updates to the map information 1194 may include updates for the HD map 1122, such as information regarding construction sites, potholes, detours, flooding, and/or other obstructions. In some examples, the neural networks 1192, the updated neural networks 1192, and/or the map information 1194 may have resulted from new training and/or experiences represented in data received from any number of vehicles in the environment, and/or based on training performed at a datacenter (e.g., using the server(s) 1178 and/or other servers).

The server(s) 1178 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1190, and/or the machine learning models may be used by the server(s) 1178 to remotely monitor the vehicles.

In some examples, the server(s) 1178 may receive data from the vehicles and apply the data to up-to-date real-time neural networks for real-time intelligent inferencing. The server(s) 1178 may include deep-learning supercomputers and/or dedicated AI computers powered by GPU(s) 1184, such as a DGX and DGX Station machines developed by NVIDIA. However, in some examples, the server(s) 1178 may include deep learning infrastructure that use only CPU-powered datacenters.

The deep-learning infrastructure of the server(s) 1178 may be capable of fast, real-time inferencing, and may use that capability to evaluate and verify the health of the processors, software, and/or associated hardware in the vehicle 1100. For example, the deep-learning infrastructure may receive periodic updates from the vehicle 1100, such as a sequence of images and/or objects that the vehicle 1100 has located in that sequence of images (e.g., via computer vision and/or other machine learning object classification techniques). The deep-learning infrastructure may run its own neural network to identify the objects and compare them with the objects identified by the vehicle 1100 and, if the results do not match and the infrastructure concludes that the AI in the vehicle 1100 is malfunctioning, the server(s) 1178 may transmit a signal to the vehicle 1100 instructing a fail-safe computer of the vehicle 1100 to assume control, notify the passengers, and complete a safe parking maneuver.

For inferencing, the server(s) 1178 may include the GPU(s) 1184 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   receiving images of one or more objects having a plurality of backgrounds;
   selecting a background based at least on first inference data that corresponds to one or more predictions of a prediction task performed using the images for the one or more objects;
   generating an image based at least on integrating an object with the background based at least on the selecting of the background;
   applying the image to at least one neural network to generate second inference data corresponding to the prediction task; and
   updating one or more parameters of the at least one neural network based at least on the second inference data.

2. The method of claim 1, wherein the selecting is based at least on an analysis of a plurality of inference scores for a group of the images that include the background and the plurality of inference scores is generated from the first inference data.

3. The method of claim 1, wherein the first inference data is generated using the at least one neural network in a first epoch of training the at least one neural network and the using of the image is in a second epoch of the training.

4. The method of claim 1, wherein the generating the image includes generating a mask based at least on identifying a region of the object in the image and applying the mask to the image.

5. The method of claim 1, wherein the selecting of the background is based at least on determining at least one inference score generated from the first inference data is below a threshold value.

6. The method of claim 1, wherein the first inferenced data corresponds to a first cropped region of the background and the integrating of the object is with a second cropped region of the background that is different than the first cropped region.

7. The method of claim 1, where the background is of a background type and the method further comprises synthetically generating the background based at least on the background type.

8. A system comprising:
   one or more processing units to:
      analyze first inference data corresponding to one or more predictions of one or more prediction tasks performed on one or more objects depicted in one or more first images;
      based at least on the analyzing of the first inference data, determine one or more backgrounds for at least one object of the one or more objects;
      generate one or more second images based at least on integrating the at least one object with the one or more backgrounds;
      apply the one or more second images to at least one neural network to generate second inference data corresponding to at least one prediction task of the one or more prediction tasks; and
      update one or more parameters of the at least one neural network based at least on the second inference data.

9. The system of claim 8, wherein the first inference data corresponds to a plurality of images that include a same background of the one or more backgrounds.

10. The system of claim 8, wherein the first inference data is generated using the at least one neural network in a first epoch of training the at least one neural network and the updating of the one or more parameters is in a second epoch of the training.

11. The system of claim 8, wherein the generating the one or more second images includes generating one or more masks based at least on identifying one or more regions of the at least one object in the one or more second images, and applying the one or more masks to the one or more second images.

12. The system of claim 8, wherein the determining of the one or more backgrounds is based at least on determining at least one inference score corresponding to the first inference data is below a threshold value.

13. The system of claim 8, wherein the first inference data corresponds to one or more first cropped regions of the one or more backgrounds and the integrating of the at least one object is with one or more second cropped regions of the one or more backgrounds that are different than the one or more first cropped regions.

14. The system of claim 8, wherein the one or more backgrounds are of one or more background types and the one or more processing units are further to synthetically generate the one or more backgrounds based at least on the one or more background types.

15. The system of claim 8, wherein the system includes at least one of:
   a control system for an autonomous or semi-autonomous machine;
   a perception system for an autonomous or semi-autonomous machine;
   a system for performing simulation operations;
   a system for performing deep learning operations;
   a system implemented using an edge device;
   a system implemented using a robot;
   a system incorporating one or more Virtual Machines (VMs);
   a system implemented at least partially in a data center; or
   a system implemented at least partially using cloud computing resources.

16. A processor comprising:
   one or more circuits to update one or more parameters of at least one neural network based at least on first inference data corresponding to one or more prediction tasks, the first inference data generated by applying one or more first images to the at least one neural network, the one or more first images depicting one or more objects integrated with one or more backgrounds based at least on one or more inference scores generated using second inference data that corresponds to one or more predictions of the one or more prediction tasks performed using the at least one neural network on the one or more objects depicted in one or more second images.

17. The processor of claim 16, wherein the one or more inference scores comprise a plurality of inference scores for a group of the one or more first images that include the one or more backgrounds, and the one or more objects are integrated with the one or more backgrounds based at least on an analysis of the plurality of inference scores.

18. The processor of claim 16, wherein the one or more inference scores are generated using the at least one neural network in a first epoch of training the at least one neural network and the one or more parameters are updated in a second epoch of the training.

19. The processor of claim 16, wherein the one or more first images are generated based at least on generating one or more masks based at least on identifying one or more regions of the one or more objects in the one or more first images and applying the one or more masks to the one or more first images.

20. The processor of claim 16, wherein the one or more objects are integrated with the one or more backgrounds based at least on determining at least one inference score of the one or more inference scores is below a threshold value.

21. The processor of claim 16, wherein the one or more inference scores correspond to one or more first cropped regions of the one or more backgrounds and the integrating of the one or more objects is with one or more second cropped regions of the one or more backgrounds that are different than the one or more first cropped regions.

22. The processor of claim 16, wherein the processor is comprised in at least one of:
   a control system for an autonomous or semi-autonomous machine;
   a perception system for an autonomous or semi-autonomous machine;
   a system for performing simulation operations;
   a system for performing deep learning operations;
   a system implemented using an edge device;
   a system implemented using a robot;
   a system incorporating one or more Virtual Machines (VMs);
   a system implemented at least partially in a data center; or
   a system implemented at least partially using cloud computing resources.

* * * * *